(12) United States Patent
Zhang et al.

(10) Patent No.: US 11,202,070 B2
(45) Date of Patent: *Dec. 14, 2021

(54) PARALLEL BI-DIRECTIONAL INTRA-CODING OF SUB-PARTITIONS

(71) Applicant: HULU, LLC, Santa Monica, CA (US)

(72) Inventors: Wenhao Zhang, Beijing (CN); Jing Cui, Beijing (CN)

(73) Assignee: HULU, LLC, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/886,641

(22) Filed: May 28, 2020

(65) Prior Publication Data

US 2020/0382777 A1    Dec. 3, 2020

Related U.S. Application Data

(60) Provisional application No. 62/854,746, filed on May 30, 2019.

(51) Int. Cl.
| | | |
|---|---|---|
| *H04N 7/18* | (2006.01) | |
| *H04N 19/119* | (2014.01) | |
| *H04N 19/105* | (2014.01) | |
| *H04N 19/176* | (2014.01) | |
| *H04N 19/436* | (2014.01) | |
| *H04N 19/40* | (2014.01) | |

(52) U.S. Cl.
CPC ......... *H04N 19/119* (2014.11); *H04N 19/105* (2014.11); *H04N 19/176* (2014.11); *H04N 19/40* (2014.11); *H04N 19/436* (2014.11)

(58) Field of Classification Search
CPC .. H04N 19/119; H04N 19/105; H04N 19/176; H04N 19/436; H04N 19/40

USPC .................................................. 375/240.02
See application file for complete search history.

(56) References Cited

U.S. PATENT DOCUMENTS

| | | | | |
|---|---|---|---|---|
| 10,887,587 | B2 * | 1/2021 | Filippov | H04N 19/105 |
| 2003/0021344 | A1 | 1/2003 | Panusopone et al. | |
| 2008/0120676 | A1 * | 5/2008 | Morad | H04N 21/42607 725/127 |
| 2008/0187044 | A1 | 8/2008 | Kim et al. | |

(Continued)

OTHER PUBLICATIONS

Chen et al, Algorithm and VLSI Architecture of a Parallel Arithmetic Entropy Coder for Parallel H.264 Video Enoders (Year: 2010).*

(Continued)

*Primary Examiner* — Shan E Elahi
(74) *Attorney, Agent, or Firm* — Fountainhead Law Group P.C.

(57) ABSTRACT

In some embodiments, a method determines a first set of reference pixels for a current block to be coded. The current block is split into a plurality of sub-partitions. The method processes a first sub-partition in the plurality of sub-partitions using the first set of reference pixels and a second sub-partition in the plurality of sub-partitions using the first set of reference pixels in parallel. Then the method processes a third sub-partition in the plurality of sub-partitions based on a second set of reference pixels determined from the processing of the first sub-partition and processing a fourth sub-partition in the plurality of sub-partitions based on a third set of reference pixels determined from the processing of the second sub-partition.

20 Claims, 17 Drawing Sheets

(56) References Cited

U.S. PATENT DOCUMENTS

| | | | |
|---|---|---|---|
| 2012/0163460 A1* | 6/2012 | Chien | H04N 19/523 |
| | | | 375/240.16 |
| 2013/0101035 A1* | 4/2013 | Wang | H04N 19/70 |
| | | | 375/240.12 |
| 2013/0121417 A1* | 5/2013 | Chong | H04N 19/159 |
| | | | 375/240.15 |
| 2013/0182775 A1* | 7/2013 | Wang | H04N 19/46 |
| | | | 375/240.24 |
| 2013/0182779 A1 | 7/2013 | Lim et al. | |
| 2013/0188699 A1* | 7/2013 | Joshi | H04N 19/18 |
| | | | 375/240.12 |
| 2013/0272370 A1* | 10/2013 | Coban | H04N 19/174 |
| | | | 375/240.01 |
| 2014/0072041 A1* | 3/2014 | Seregin | H04N 19/176 |
| | | | 375/240.13 |
| 2014/0334532 A1* | 11/2014 | Pearson | H04N 19/40 |
| | | | 375/240.02 |
| 2015/0139298 A1 | 5/2015 | Seregin et al. | |
| 2015/0319451 A1* | 11/2015 | Henry | H04N 19/196 |
| | | | 375/240.12 |
| 2016/0094851 A1* | 3/2016 | Pu | H04N 19/13 |
| | | | 375/240.24 |
| 2016/0100191 A1 | 4/2016 | Mishra et al. | |
| 2016/0134876 A1* | 5/2016 | Chong | H04N 19/122 |
| | | | 375/240.02 |
| 2017/0094285 A1 | 3/2017 | Said et al. | |
| 2017/0238005 A1* | 8/2017 | Chien | H04N 19/176 |
| | | | 375/240.16 |
| 2019/0052883 A1* | 2/2019 | Ikeda | H03M 7/4018 |
| 2019/0238837 A1* | 8/2019 | Filippov | H04N 19/80 |
| 2020/0382804 A1 | 12/2020 | Zhang et al. | |

OTHER PUBLICATIONS

Santiago De-Luxan-Hernandez et al, An Intra subpartition coding mode for VVC (Year: 2019).*

Corresponding U.S. Appl. No. 16/886,627, filed May 28, 2020, 36 pages.

Chen et al, Algorithm and VLSI Architecture of a Parallel Arithmetic Entropy Coder for Parallel H .264 Video Encoders (2010).

* cited by examiner

PARALLEL BI-DIRECTIONAL INTRA-CODING OF SUB-PARTITIONS

CROSS REFERENCE TO RELATED APPLICATIONS

Pursuant to 35 U.S.C. § 119(e), this application is entitled to and claims the benefit of the filing date of U.S. Provisional App. No. 62/854,746, filed May 30, 2019, the content of which is incorporated herein by reference in its entirety for all purposes.

BACKGROUND

In video coding, video content is compressed via a set of processes, including prediction, transformation, quantization, and entropy coding. In intra-prediction, spatial redundancy between adjacent pixels in a video frame is reduced. For example, the original pixels of a video frame may not be encoded and transmitted to a decoder. Rather, predicted pixels may be subtracted from the original pixels to form a residual. The residual is a smaller amount of information than the original pixels to encode and transmit to the decoder. This reduces the bandwidth used to transmit the encoded bitstream.

DETAILED DESCRIPTION

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

In intra-prediction, a transcoder may subtract predicted pixels from the original pixels of a video frame to reduce the volume of values that needs to be transcoded. One method of an intra-prediction coding mode is to split an intra-coding block into multiple sub-partitions and process the sub-partitions separately. Conventionally, the sub-partitions are processed serially when one sub-partition is transcoded before starting the transcoding process for another sub-partition, or when one sub-partition is decoded before starting the decoding process for another sub-partition. However, some embodiments process groups of the sub-partitions in parallel. This improves the speed of the coding process by at least two times compared to coding the sub-partitions serially. When processing the sub-partitions in parallel, the reference pixels from two sub-partitions may be used to process the next two sub-partitions. Also, when two reference pixels are used, the two reference pixels may be weighted differently when predicting the value of a pixel, such as based on a distance from a pixel being transcoded or decoded.

System

Figure 1:
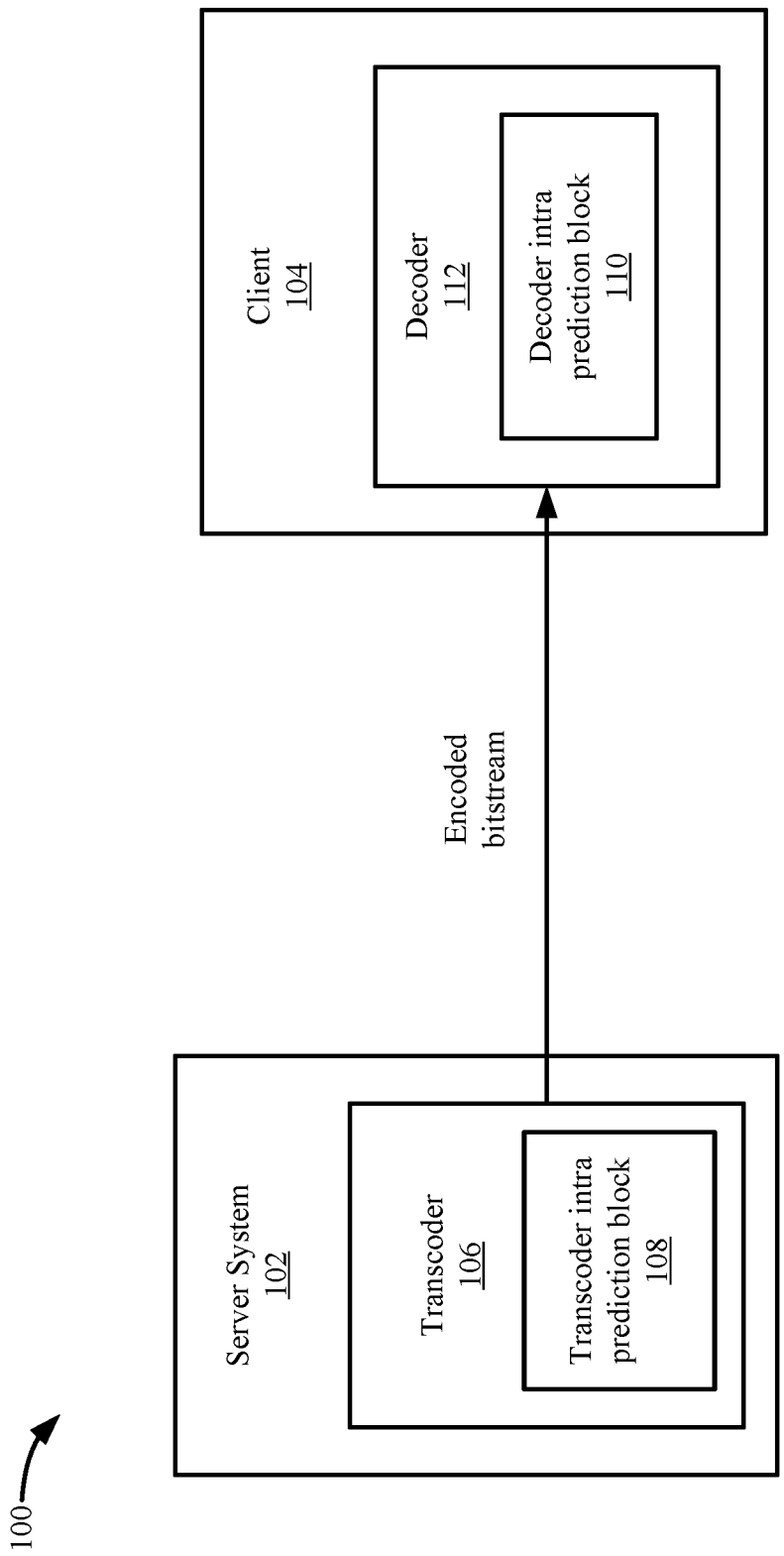
FIG. 1 depicts a simplified system for performing intra prediction according to some embodiments.

FIG. 1 depicts a simplified system 100 for performing intra prediction according to some embodiments. System 100 transcodes a source video asset, which may be any type of video, such as for a television show, movie, or video clip. The source video may need to be transcoded into one or more formats, such as one or more bitrates. In some embodiments, a server system 102 sends an encoded bitstream to client 104. For example, server system 102 may be sending a video to a client 104 for playback.

Server system 102 includes a transcoder 106 that transcodes video into an encoded bitstream. Transcoder 106 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

Transcoder 106 includes a transcoder intra prediction block 108 that performs intra prediction. An intra-coding mode is used by the transcoder side and the decoder side to compress a video by removing spatial redundancy of neighboring pixels in a video frame. Traditionally, intra-coding may intra-code a current block of a pixel size equal to N×N. In some embodiments, the pixels inside the current block are intra-coded using pixels from adjacent blocks to the current block, such as blocks to the top, left, and diagonally to the current block.

Client 104 includes a decoder 112 that decodes the encoded bitstream. During the decoding process, a decoder intra prediction block 110 performs intra prediction to decode a block using the pixels from adjacent blocks to the current block, such as blocks to the top, left, and diagonally to the current block.

Figure 2:
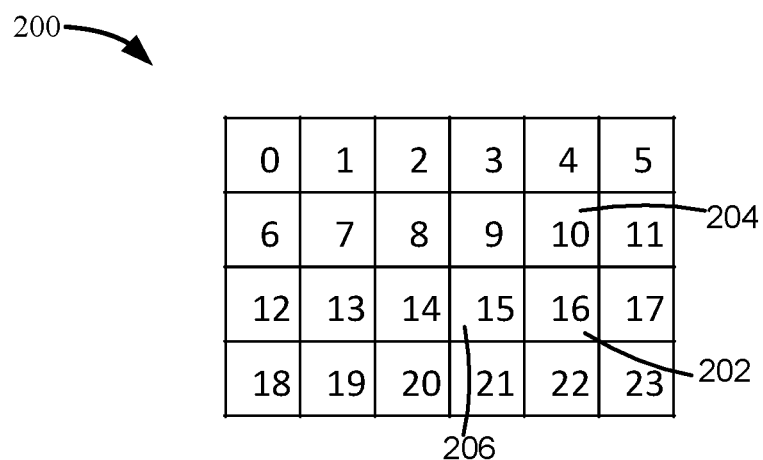
FIG. 2 depicts an example of a frame for intra prediction according to some embodiments.

FIG. 2 depicts an example of a frame 200 for intra prediction according to some embodiments. Frame 200 may be an image that is being transcoded or decoded. Frame 200 includes multiple blocks and a current block 202 (#16) is being transcoded or decoded. A top block 204 (#10) to the top of current block 202 and a left block 206 (#15) to the left of current block 202 have already been decoded. The pixels from left block 206 and top block 204 may be used to predict the content of current block 202. Because these pixels have already been decoded, the pixels can be used to predict the content of the current block. For example, the neighboring pixels may be similar to some of the pixels of the current block and provide a good prediction of the current pixels in current block 202. Pixels from other blocks may also be used, such as pixels from blocks #9, #11, and #21 (diagonally located) if pixels from these blocks are available (e.g., have been transcoded and then decoded).

Transcoder

Figure 3:
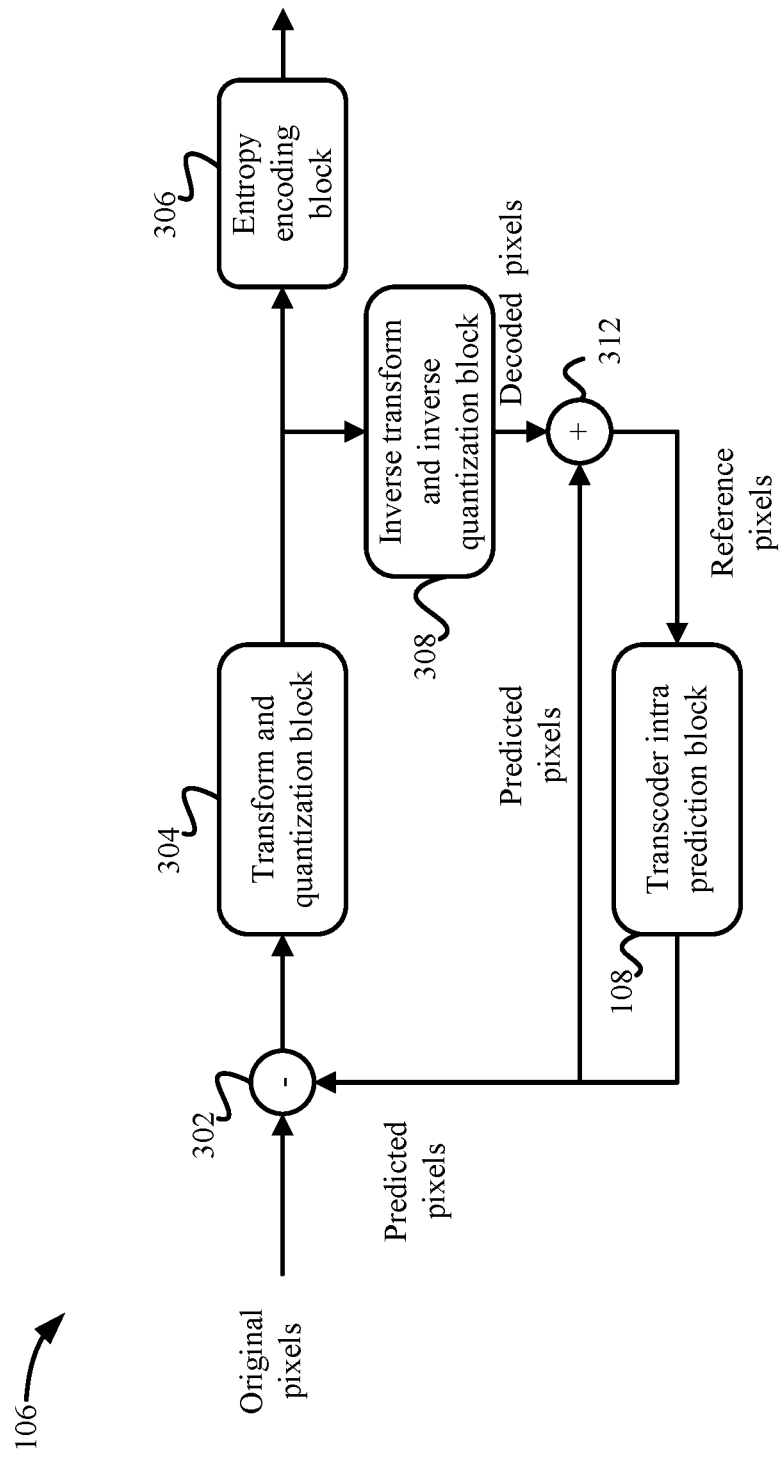
FIG. 3 depicts an example of a transcoder according to some embodiments.

FIG. 3 depicts an example of transcoder 106 according to some embodiments. FIG. 3 includes a simplified version of a transcoder and a more detailed version will be described below. Transcoder 106 receives original pixels from a current block 202 being transcoded. At 302, transcoder 106 then subtracts the predicted pixels from the original pixels to produce a residual, which includes the pixels that will be transcoded. For example, as part of the transcoding process, a transform and quantization block 304 performs a transform step and a quantization step (T/Q) on the residual values to further compress the data size to be transcoded. Finally, an entropy encoding block 306 processes the resulting data by entropy coding the data. Transcoder 106 packages the data into an encoded bitstream that transcoder 106 transmits to the decoder side.

To ensure that the decoder side is performing the decoding process with the identical behavior as the transcoder side, transcoder 106 includes an inverse quantization and inverse transform block 308 and an intra-prediction block (e.g., transcoder intra prediction block 108) that mirrors the decoding pipeline. This loop generates reconstructed pixels for a decoded current block 202, which serve as reference pixels for the next coding block in the encoding order. For example, at 312, transcoder 106 adds the predicted pixels used to transcode the current block with the decoded pixels of the residual to generate the reference pixels.

Transcoder intra prediction block 108 generates the predicted pixel values using neighboring reference pixel values to a next current block to be transcoded. For example, transcoder intra prediction block 108 receives reference pixel values and depending on the intra-mode used, generates predicted pixel values. The intra-prediction mode may include the direction of the prediction, and different reference pixels are used based on the direction used. That is, a horizontal intra-prediction direction may use reference pixels to a left side of the current block and a vertical intra-prediction direction may use reference pixels on the top of the current block. The directions may also include diagonal directions. Transcoder intra prediction block 108 may generate predicted pixels from the reference pixels and the direction of the prediction. Transcoder intra prediction block 108 may determine the direction of the prediction in different ways. In some embodiments, transcoder intra prediction block 108 may examine all the possible intra prediction directions, and select the best one based on rules, such as a rate-distortion optimization metric. The predicted pixels may be used because some directions may require some interpolation of reference pixel values; for instance, a diagonal direction may interpolate pixel values from one or more reference pixels.

Decoder

Figure 4:
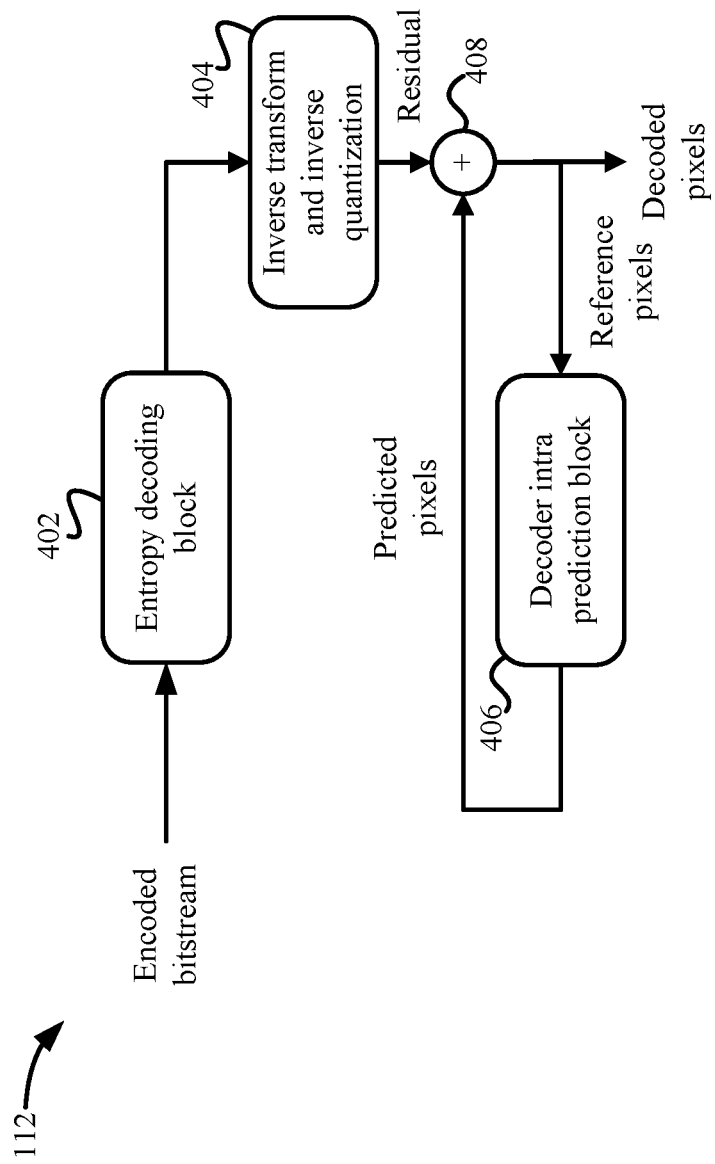
FIG. 4 depicts a more detailed example of a decoder according to some embodiments.

FIG. 4 depicts a more detailed example of decoder 112 according to some embodiments. FIG. 4 includes a simplified version of a decoder and a more detailed version will be described below. At the decoder side, decoder 112 receives the encoded bitstream and an entropy decoding block 402 performs entropy decoding. Then, an inverse quantization and inverse transform block 404 performs an inverse quantization step and an inverse transformation step ($Q^{-1}\backslash T^{-1}$). The output of the inverse quantization and inverse transformation steps is the residual. At 408, decoder 112 then combines the residual with the predicted pixels that were used to generate the residual at transcoder 106 to generate the decoded pixels. The decoded pixels are a reconstructed representation of the original pixels.

A decoder intra-prediction block 406 generates the predicted pixels from the reference pixels, such as the decoded reference pixels from the current block being decoded. The decoded pixels are used as reference pixels for the next coding block in the decoding order. Another coding block in the coding order may use predicted pixels that are generated from the reference pixels to decode the encoded bitstream for another block.

Intra Prediction

During intra prediction, the transcoder side and the decoder side may perform intra-sub-partitioning using an intra-sub-partition (ISP) mode. Intra-sub-partitioning splits an intra-coding block into multiple sub-partitions (SP) and transcodes or decodes the sub-partitions separately.

Figure 5A:
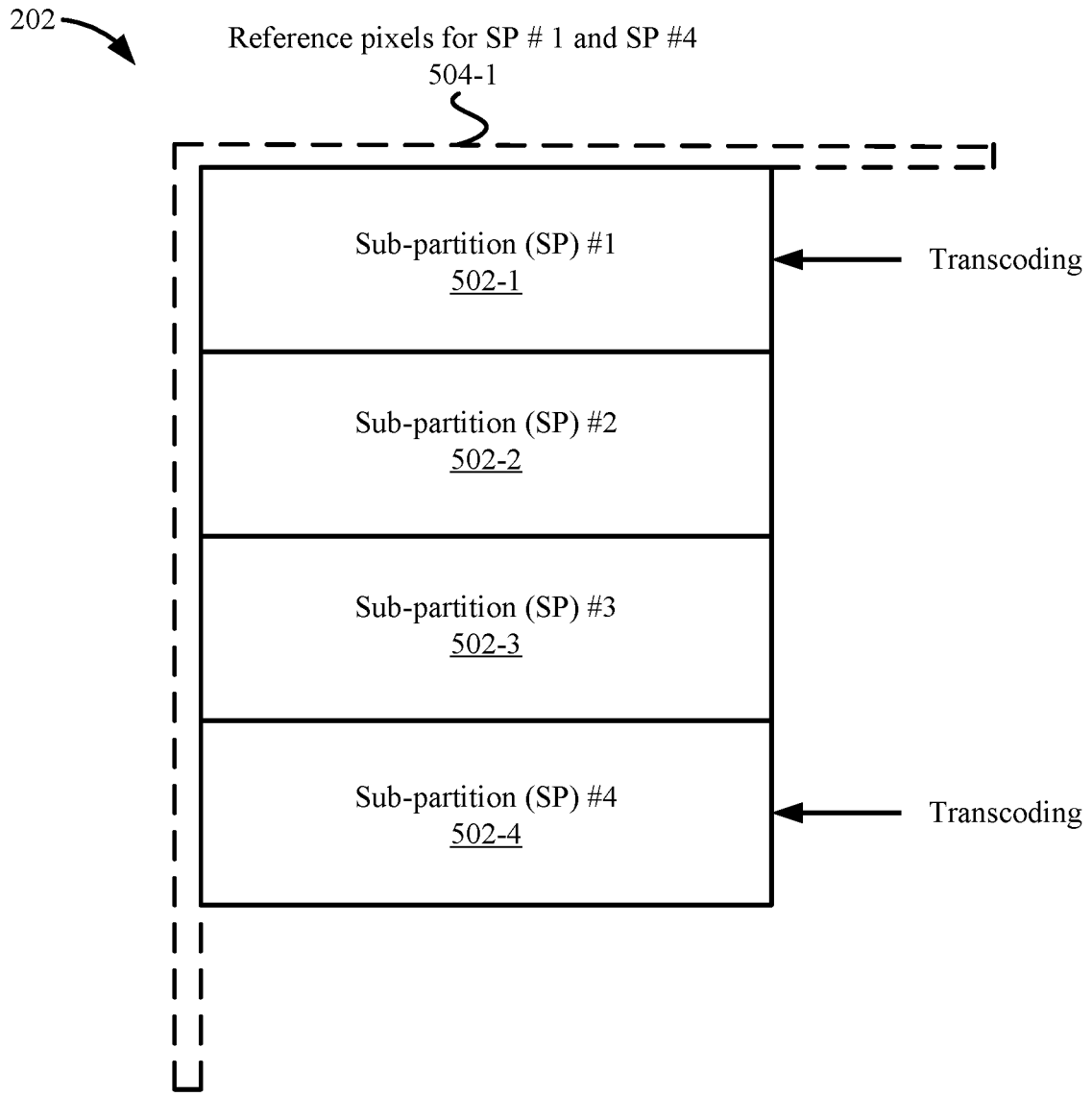
FIG. 5A depicts an example of transcoding sub-partitions #1 and #4 in a current block according to some embodiments.

FIG. 5A depicts an example of transcoding sub-partitions #1 and #4 in a current block 202 according to some embodiments. Current block 202 has been split into four sub-partitions of a sub-partition #1 502-1, a sub-partition #2 502-2, a sub-partition #3 502-3, and a sub-partition #4 502-4. Although four sub-partitions are described, other numbers of sub-partitions may be used, such as two sub-partitions, six sub-partitions, eight sub-partitions, etc. Also, the sub-partitions may be split horizontally or vertically. In FIG. 5A, the current block has been split horizontally; however, the current block can be split vertically or in other patterns. Sub-partition #1 502-1 may be found on a top edge of a block and sub-partition #4 502-4 is not next to sub-partition #1 502-1. Rather, sub-partition #2 502-2 and sub-partition #3 502-3 are in between sub-partition #1 502-1 and sub-partition #4 502-4.

In the transcoding process, transcoder 106 processes the sub-partitions 502 separately, which means transcoder 106 transcodes the pixels of a sub-partition 502-1 first, and then transcodes the pixels of a next sub-partition 502-2, and so. As discussed above, transcoder 106 uses reference pixels to transcode each sub-partition 502. For example, reference pixels from already transcoded blocks are used to transcode each sub-partition 502.

Transcoder 106 selects the reference pixels that are used for each sub-partition 502 in a way such that the transcoder can transcode some sub-partitions in parallel. Conventionally, the sub-partitions may have been transcoded serially; for example, the transcoder first transcodes sub-partition #1 502-1, and then uses reference pixels from sub-partition #1 502-1 to transcode sub-partition #2 502-2, and then uses reference pixels from sub-partition #2 502-2 to transcode sub-partition #3 502-3, and then finally uses reference pixels from sub-partition #3 502-3 to transcode sub-partition #4

502-4. This forces the transcoder to transcode the sub-partitions 502 serially. Instead of transcoding sub-partitions 502 serially, the transcoder transcodes groups of the sub-partitions 502 in parallel, which speeds up the transcoding time of the current block. Transcoder 106 may include multiple transcoding processes that can perform the transcoding of sub-partitions 502 in parallel, or separate transcoders may be used.

To transcode the sub-partition 502 in parallel, reference pixels for some of the sub-partitions 502 are changed from the reference pixels used to transcode the sub-partitions serially. For example, the reference pixels 504-1 that are used for sub-partition #1 502-1 and sub-partition #4 502-4 are shared. Then, transcoder 106 transcodes sub-partition #1 and sub-partition #4 in parallel. Once, the transcoder 106 transcodes and decodes sub-partition #1 and sub-partition #4, then reference pixels from sub-partition #1 and sub-partition #4 can be used to transcode sub-partition #2 and sub-partition #3 in parallel.

Figure 5B:
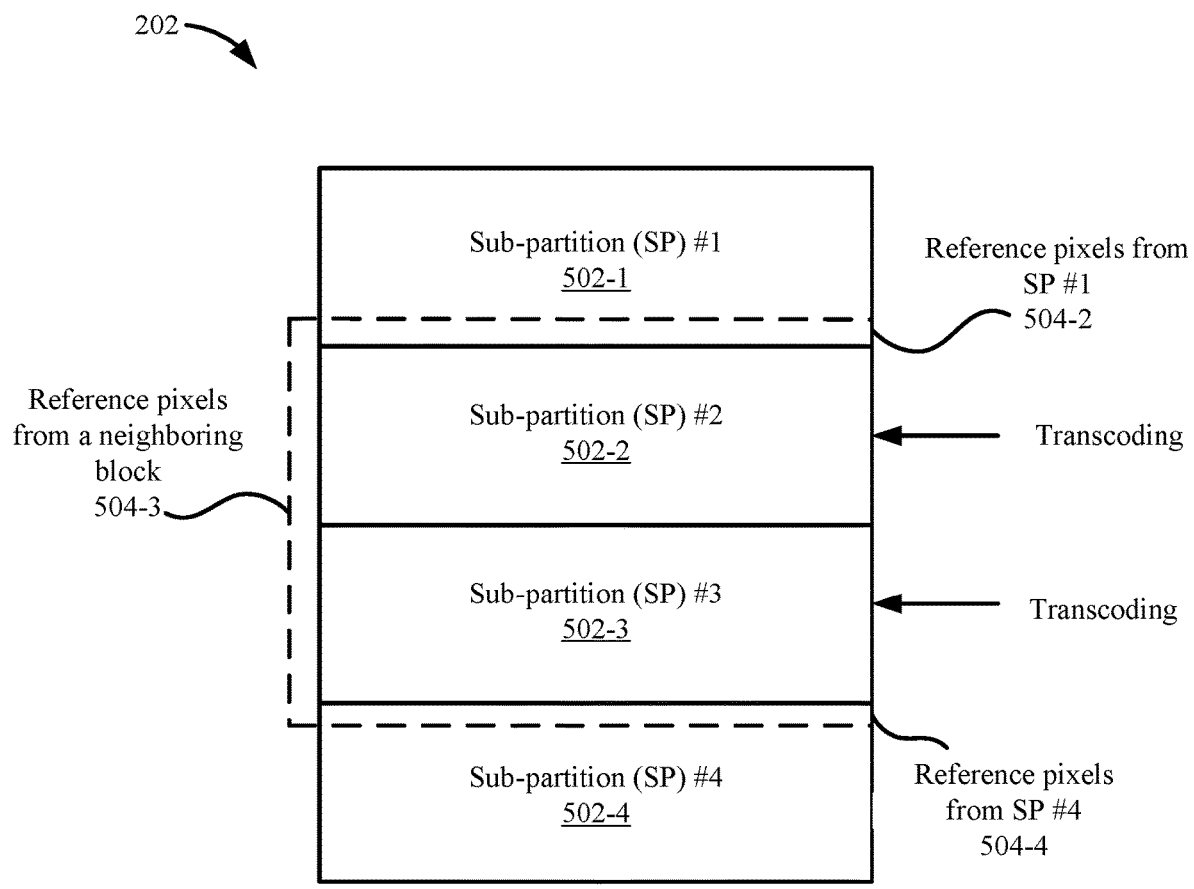
FIG. 5B depicts an example of transcoding sub-partitions #2 and #3 in the current block according to some embodiments.

FIG. 5B depicts an example of transcoding sub-partitions #2 and #3 in current block 202 according to some embodiments. Transcoder 106 transcodes sub-partition #2 and sub-partition #3 using reference pixels from a neighboring block, sub-partition #1, and/or sub-partition #4. For example, reference pixels 504-2 from sub-partition #1 502-1 are found above sub-partition #2 502-2. Reference pixels 504-3 from a neighboring block are found to the left of current block 202 and are not within any of the sub-partitions. Reference pixels 504-4 from sub-partition #4 502-4 are found below sub-partition #3 502-3. As can be seen, sub-partition #2 502-2 is in between reference pixels 504-2 from sub-partition #1 502-1 and sub-partition #3 502-3. Similarly, sub-partition #3 502-3 is in between reference pixels 504-4 from sub-partition #4 502-4 and sub-partition #2 502-2. Using these reference pixels is different from processing the sub-partitions serially. For example, reference pixels from sub-partition #1 504-1 are farther away from sub-partition #3 502-3 compared to reference pixels from sub-partition #2 502-2. Similarly, reference pixels 504-4 from sub-partition #4 502-4 are farther away from sub-partition #2 502-2 compared to reference pixels from sub-partition #1 504-1. Also, the reference pixels 504-3 from a neighboring block may be different from the reference pixels for sub-partition #1 502-2 and sub-partition #4 502-4. For example, reference pixels 504-3 from a neighboring block are located next to (e.g., to the left) of sub-partition #2 502-2 and sub-partition #3 502-4, and not next to sub-partition #1 502-2 and sub-partition #4 502-4. The following describes intra prediction scenarios using the reference pixels from sub-partition #1 502-2 and reference pixels 504-4 from sub-partition #4 502-4 when transcoding sub-partition #2 502-2 and sub-partition #3 502-3.

Although transcoding was described above, decoder 112 may use the sub-partitions in a similar manner in the decoding process, which will be described in more detail below.

Intra Prediction Scenarios

Transcoder 106 will be used to describe the following scenarios, but it is recognized that decoder 112 may perform similar actions. Transcoder 106 breaks up the data interdependency among all sub-partitions to process groups of sub-partitions in parallel. Then, transcoder 106 may then perform intra prediction for sub-partition #2 and sub-partition #3 using the same reference pixels. The prediction may use a combination of reference pixels 504-2 from sub-partition #1 502-1, reference pixels 504-4 from sub-partition #4 502-4, and reference pixels 504-3 from a neighboring block. For example, the prediction may be bi-directional, which uses pixels from two sub-partitions or a sub-partition and a neighboring block. Also, the prediction may use a pixel from one sub-partition or a neighboring block. For example, given a pixel inside the region of sub-partition #2 or sub-partition #3, transcoder 106 determines the reference pixel(s) according to the intra prediction direction. Depending on the intra prediction direction, transcoder 106 may locate one or two reference pixels. Transcoder 106 may determine the best intra prediction direction of sub-partition #2 and sub-partition #3 together. The intra prediction direction is signaled in the compressed bitstream that is transmitted to decoder 112. Specifically, transcoder 106 performs the intra prediction process for sub-partition #2 and sub-partition #3 along multiple possible intra prediction directions, for example, horizontal, vertical, or regular angular ones. In some embodiments, transcoder 106 may calculate the rate-distortion values for each possible mode, and then the direction with minimum rate-distortion value will be chosen as the optimal one. Transcoder 106 may use the same intra prediction direction to transcode all pixels of sub-partition #2 and sub-partition #3.

Figure 6A:
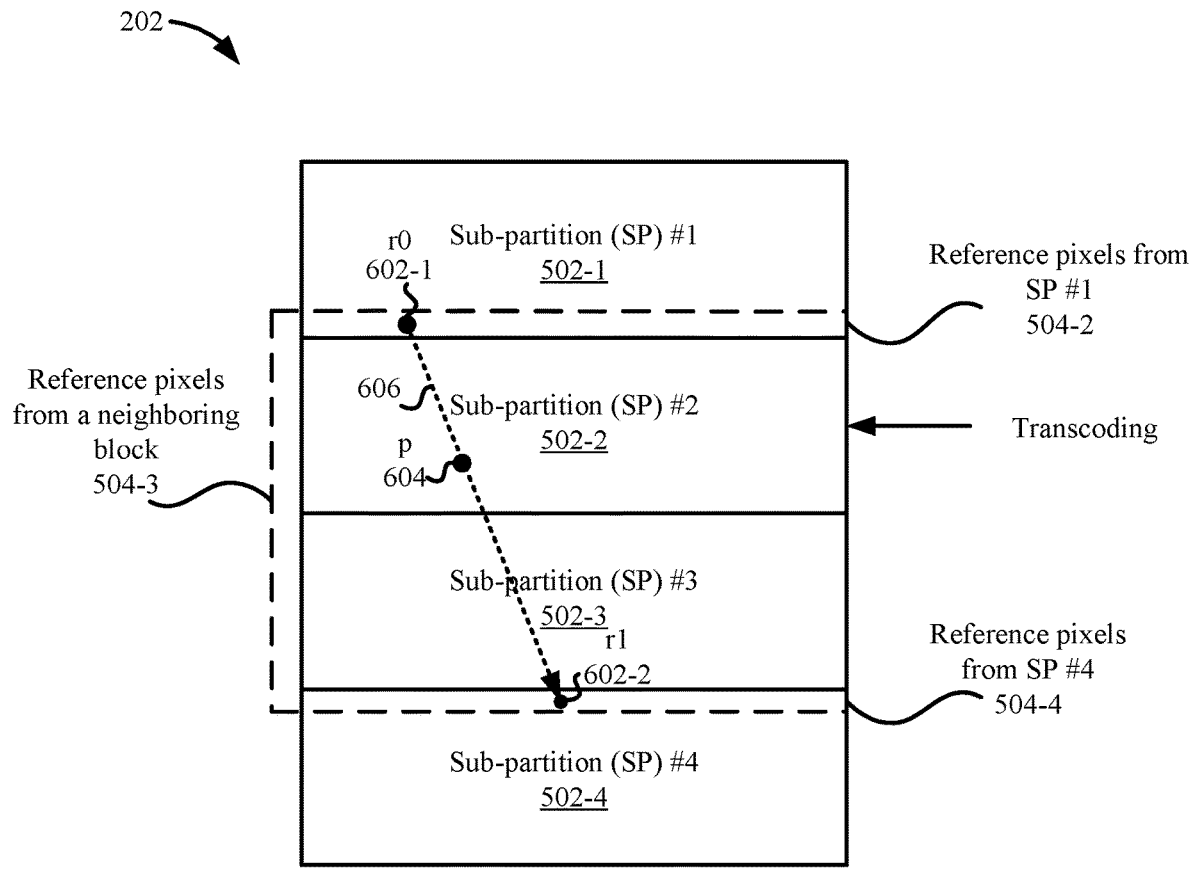
FIG. 6A depicts a first scenario for a first intra prediction direction according to some embodiments.

The following examples apply when transcoder 106 selects different directions for the intra prediction mode of sub-partition #2 and sub-partition #3. FIG. 6A depicts a first scenario for a first intra prediction direction according to some embodiments. Transcoder 106 is transcoding a pixel p 604 in sub-partition #2 502-2. Transcoder 106 uses the intra prediction direction that was determined as optimal to select the reference pixels. As discussed above, transcoder intra prediction block 108 selects the reference pixels and direction based on examining all the possible intra prediction directions, and selecting the optimal direction 606 based on rules. In this example, reference pixel r0 602-1 is from sub-partition #1 502-1 and reference pixel r1 602-2 is from sub-partition #4 502-4. The intra-prediction direction intersects reference pixels 504-2 from sub-partition #1 502-1 and reference pixels 504-4 from sub-partition #4 502-4, and not reference pixels 504-3 from a neighboring block.

Transcoder intra prediction block 108 may calculate the prediction value of pixel p using different processes. In some embodiments, transcoder intra prediction block 108 may use values from reference pixel r0 602-1 and reference pixel r1 602-2 to calculate the predicted value for pixel p 604. The calculation may use different values for weights for the values of reference pixel r0 602-1 and reference pixel r1 602-2, which will be described in more detail below. Now, the other scenarios of possible intra prediction directions will be discussed first.

Although transcoder 106 is transcoding a pixel p 604 in sub-partition #2 502-2, transcoder 106 may perform the same process to predict a pixel in sub-partition #3 502-3. This is applicable for all the following scenarios.

Figure 6B:
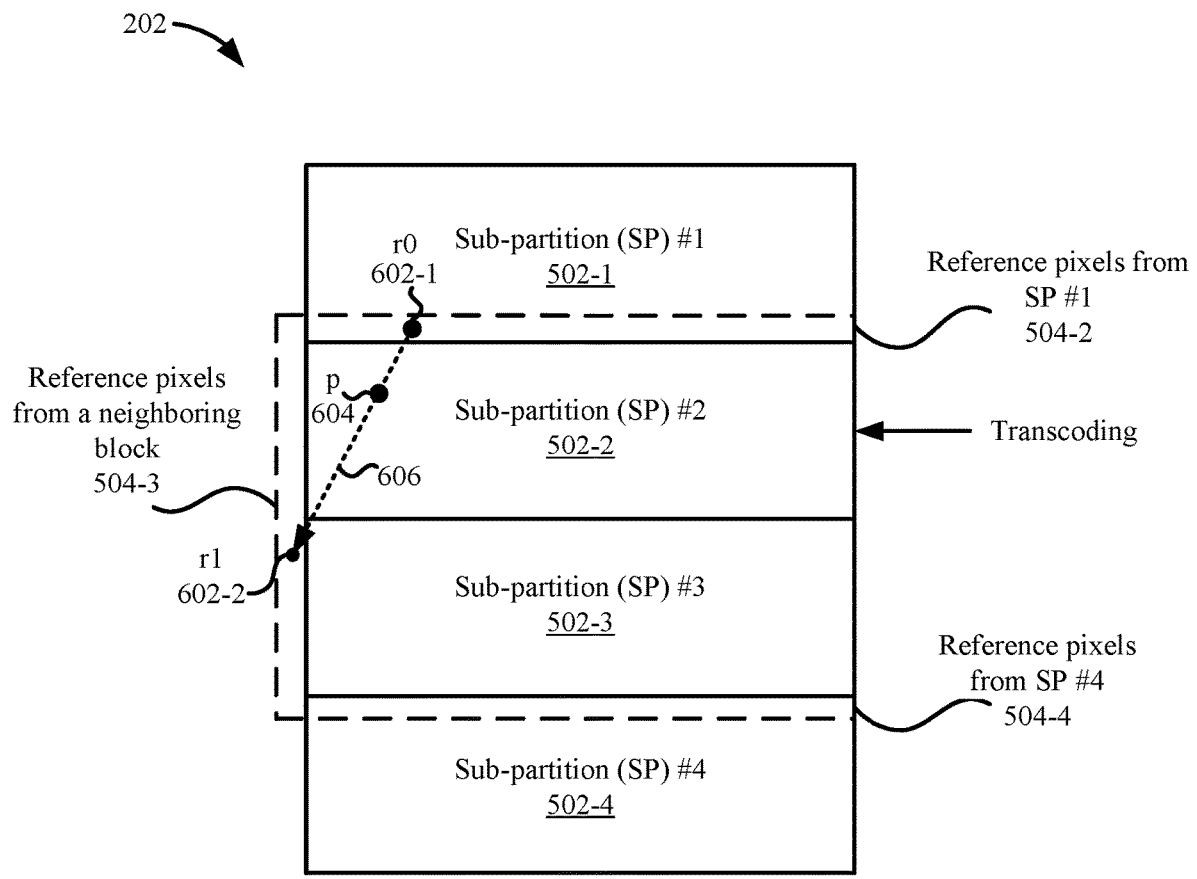
FIG. 6B depicts a second scenario for a second intra prediction direction according to some embodiments.

FIG. 6B depicts a second scenario for a second intra prediction direction according to some embodiments. Transcoder 106 is transcoding a pixel p 604 in sub-partition #2 502-2. Transcoder intra prediction block 108 selects the optimal direction 606. In this example, reference pixel r0 602-1 is from sub-partition #1 502-1 and reference pixel r1 602-2 is from the neighboring block. The intra-prediction direction intersects reference pixels 504-2 from sub-partition #1 502-1 and reference pixels 504-3 from a neighboring block, and not reference pixels 504-4 from sub-partition #4 502-4. Reference pixel r1 602-2 may be closer to pixel p 604 compared to a reference pixel 504-3 from sub-partition #4 502-4 and in some cases, may be a better prediction of pixel p 604.

Figure 6C:
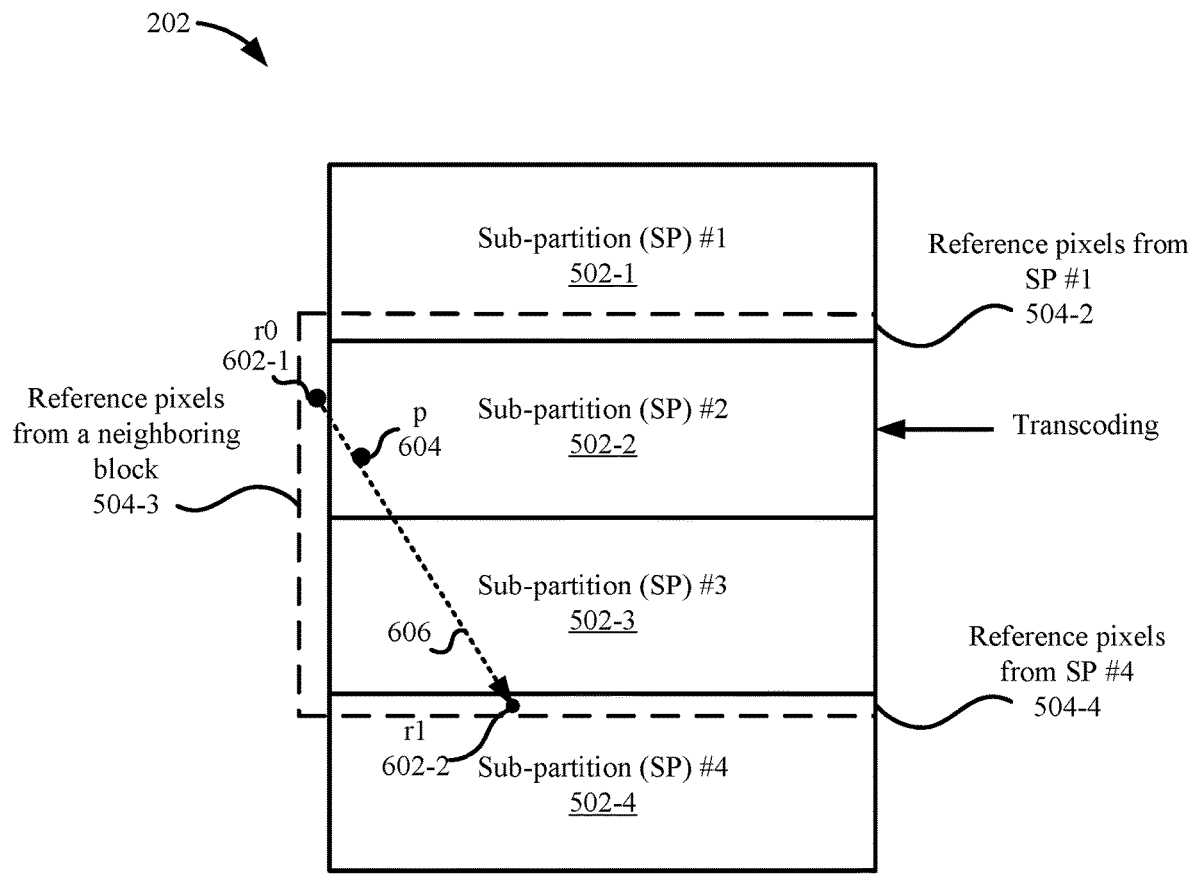
FIG. 6C depicts a third scenario for a third intra prediction direction according to some embodiments.

FIG. 6C depicts a third scenario for a third intra prediction direction according to some embodiments. Transcoder 106 is transcoding a pixel p 604 in sub-partition #2 502-2. Transcoder intra prediction block 108 selects the optimal direction 606. In this example, reference pixel r0 602-1 is from the neighboring block and reference pixel r1 602-2 is from sub-partition #4 502-4. The intra-prediction direction intersects reference pixels 504-4 from sub-partition #4 502-4 and reference pixels 504-3 from a neighboring block, and not reference pixels from sub-partition #1 504-1. Reference pixel r0 602-1 may be closer to pixel p 604 compared to a reference pixel 504-2 from sub-partition #1 502-1 and in some cases, may be a better prediction of pixel p 604.

Figure 7A:
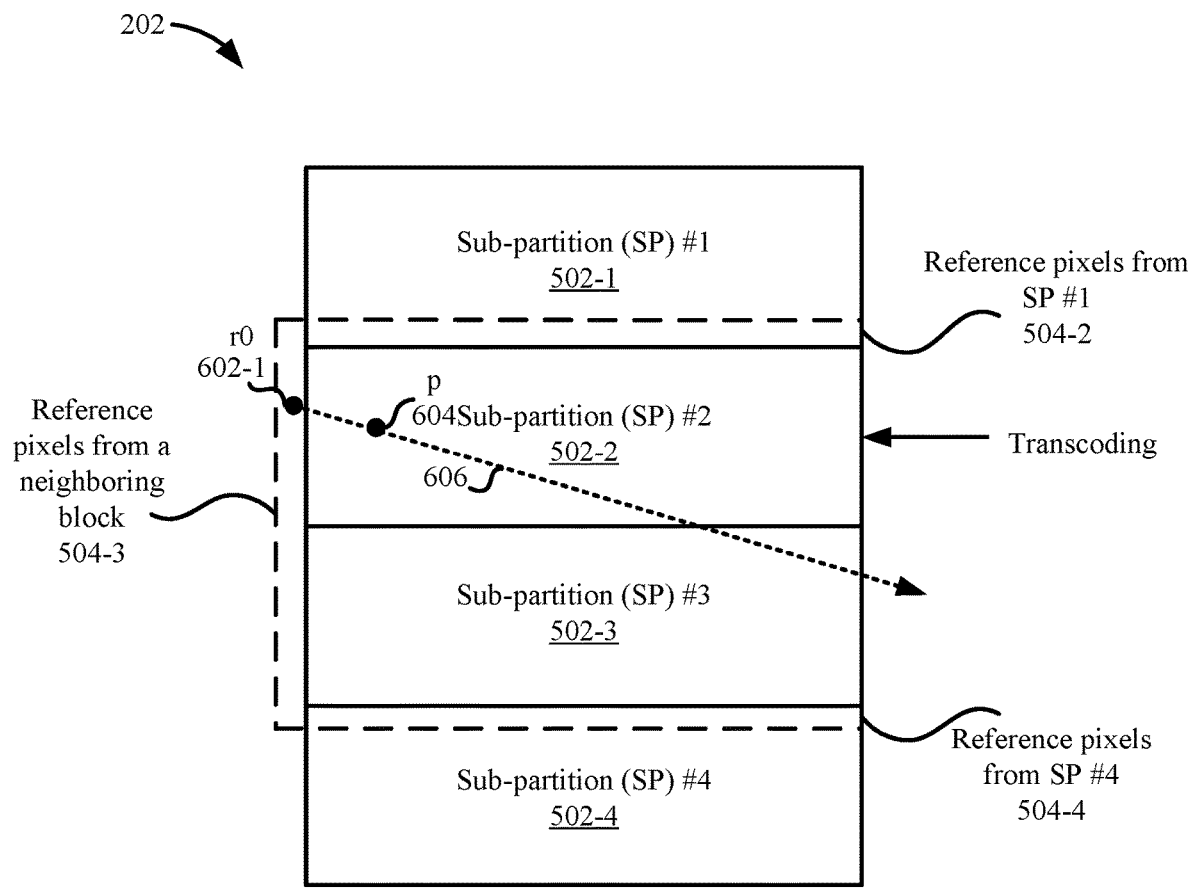
FIG. 7A depicts a fourth scenario for a fourth intra prediction direction according to some embodiments.

The above scenarios used bi-prediction with two reference pixels. Some scenarios may use uni-prediction with only a single pixel. FIG. 7A depicts a fourth scenario for a fourth intra prediction direction according to some embodiments. Transcoder 106 is transcoding a pixel p 604 in sub-partition #2 502-2. Transcoder intra prediction block 108 selects the optimal direction 606. In this example, reference pixel r0 602-1 is from the neighboring block. The intra-prediction direction intersects reference pixels 504-3 from a neighboring block, and not reference pixels 504-4 from sub-partition #4 502-4 and reference pixels 504-2 from sub-partition #1 502-1. Reference pixel r0 602-1 may be closer to pixel p 604 compared to a reference pixel 504-2 from sub-partition #1 502-1 and sub-partition #4 502-4, and in some cases, may be a better prediction of pixel p 604.

Figure 7B:
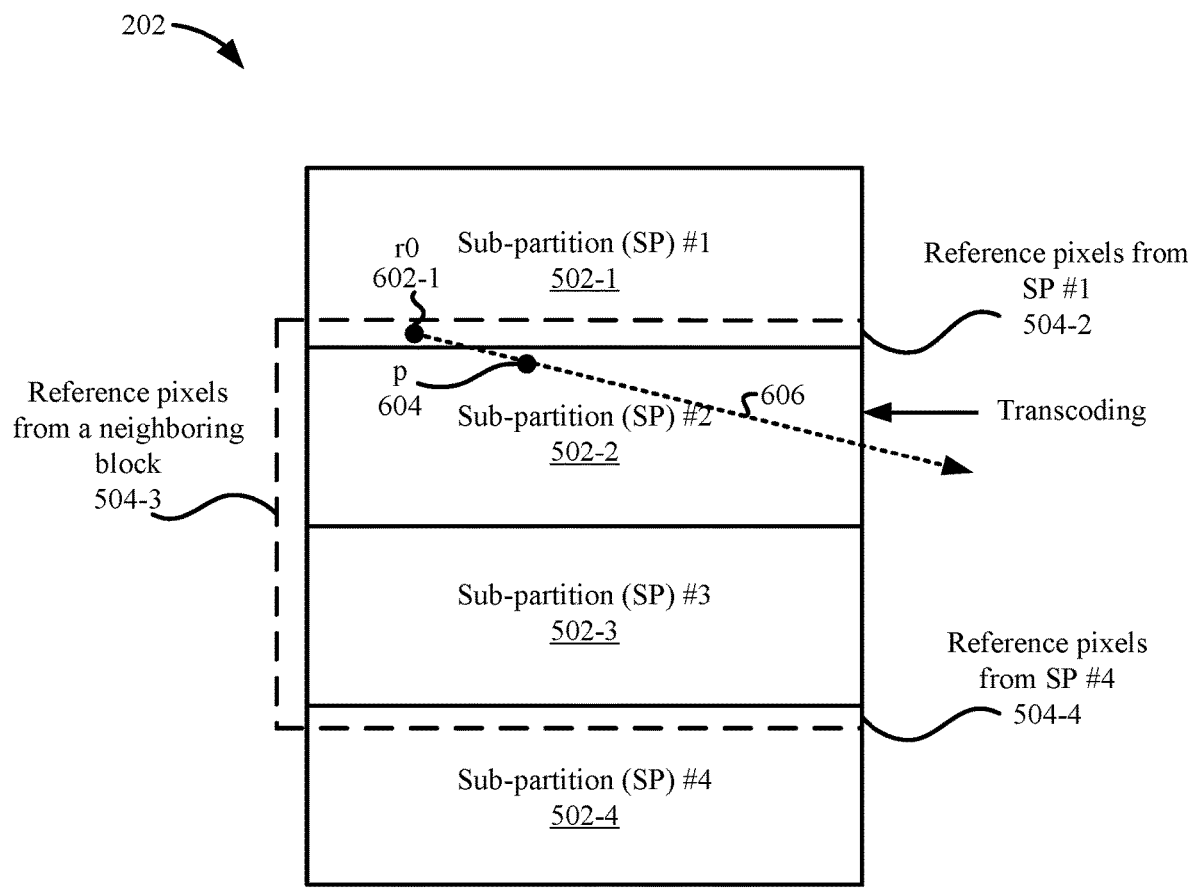
FIG. 7B depicts a fifth scenario for a fifth intra prediction direction according to some embodiments.

FIG. 7B depicts a fifth scenario for a fifth intra prediction direction according to some embodiments. Transcoder 106 is transcoding a pixel p 604 in sub-partition #2 502-2. Transcoder intra prediction block 108 selects the optimal direction 606. In this example, reference pixel r0 602-1 is from sub-partition #1 502-2. The intra-prediction direction intersects reference pixels 504-2 from sub-partition #1 502-1, and not reference pixels 504-4 from sub-partition #4 502-4 and reference pixels 504-3 from a neighboring block. Reference pixel r0 602-1 may be closer to pixel p 604 compared to a reference pixel 504-3 from the neighboring block and sub-partition #4 502-4, and in some cases, may be a better prediction of pixel p 604.

Figure 7C:
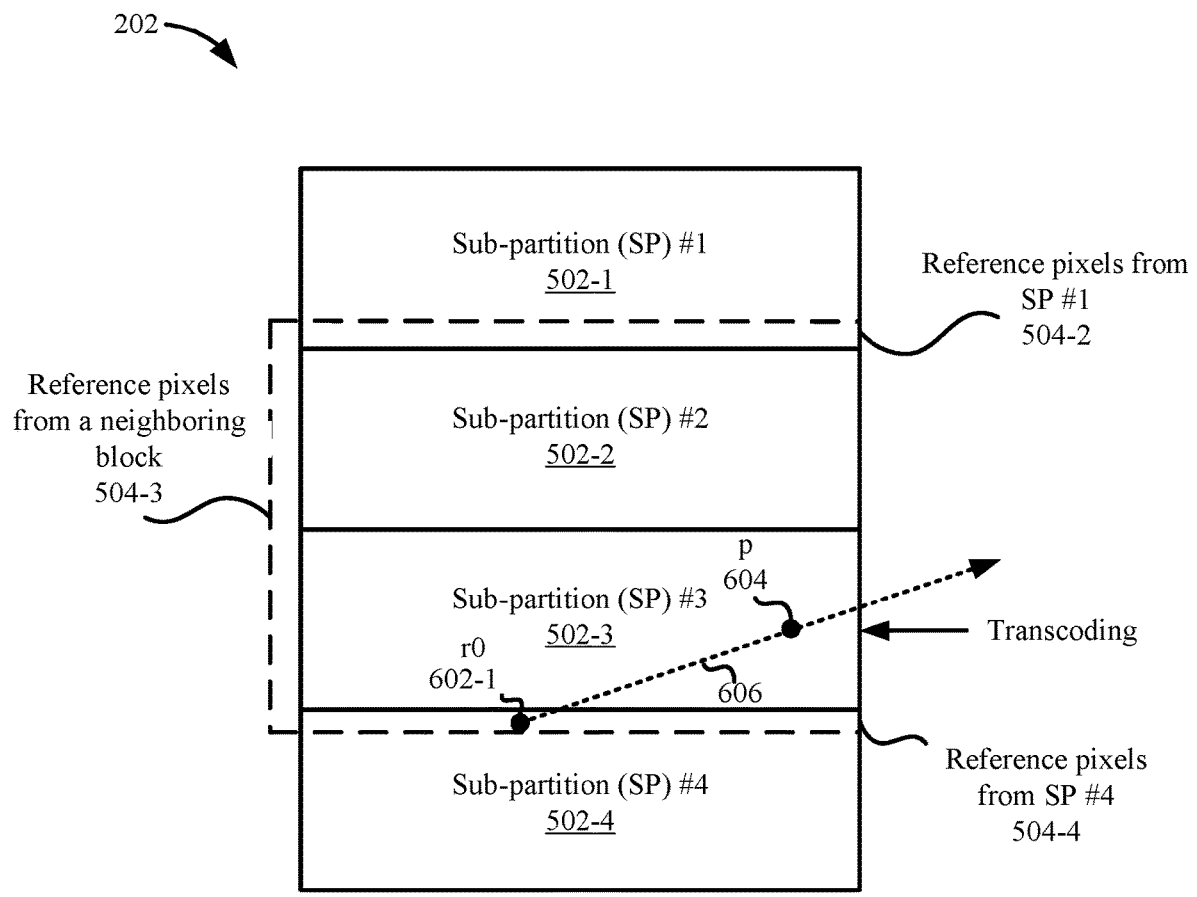
FIG. 7C depicts a fourth scenario for a sixth intra prediction direction according to some embodiments.

FIG. 7C depicts a fourth scenario for a sixth intra prediction direction according to some embodiments. Transcoder 106 is transcoding a pixel p 604 in sub-partition #3 502-3. Transcoder intra prediction block 108 selects the optimal direction 606. In this example, reference pixel r0 602-1 is from sub-partition #4 502-4. The intra-prediction direction intersects reference pixels from sub-partition #4 502-4, and not reference pixels 504-2 from sub-partition #1 502-1 and reference pixels 504-3 from a neighboring block. Reference pixel r0 602-1 may be closer to pixel p 604 compared to a reference pixel from sub-partition #1 502-2 and the neighboring block, and in some cases, may be a better prediction of pixel p 604.

For the scenarios with two reference pixels available, transcoder 106 may calculate the prediction value of pixel p using different methods. For example, transcoder 106 may apply weights to the reference pixels. In some embodiments, transcoder 106 may use the following calculation:

$$p = w_0 r0 + w_1 r1,$$

where weight w0 and weight w1 are weighting factors, p is the pixel value, and r0 and r1 are the reference pixel values. Here, the values of r0 and r1 can be equal to the reference pixels, or may be processed values of the reference pixels. In some embodiments, interpolation, filtering and pulling process are performed on reference pixel values to improve compression efficiency. Transcoder 106 may derive the value of weights $w_0$ and $w_1$ in different ways. For example, transcoder 106 may use a fixed weighting factor and an adaptive weighting factor. The fixed weighting factor may set the weights $w_0$ and $w_1$ to a fixed value, such as 0.5 each. Also, the weights w0 and w1 may be set to different fixed values, such as 0.45 and 0.55, respectively. Different directions may have different fixed values also. For example, in FIG. 6A, weight $w_0$ may be set at a higher fixed value than weight $w_1$ because reference pixel r0 may be closer to pixel p.

Transcoder 106 may determine the adaptive weighting factor based on different methods, such as by using distance from pixel p. For example, transcoder 106 may use the following:

$$w_0 = \frac{dist(p, r1)}{dist(r0, r1)}, \quad w_1 = \frac{dist(p, r0)}{dist(r0, r1)},$$

where dist(A,B) is a function measuring the spatial distance between two pixel positions of a pixel A and pixel B. Assume the positions of pixels A and B can be represented by the two-dimensional coordinates (Ax, Ay) and (Bx, By), the possible calculation of distance could be:

$$dist(A,B) = |Ax - Bx| + |Ay - By|, \text{ or}$$

$$dist(A,B) = \sqrt{(Ax-Bx)^2 + (Ay-By)^2}.$$

The weighting of the reference pixels by distance may weight a reference pixel that is closer to the pixel p greater than a reference pixel that is farther away. The reference pixel that is closer may be more likely to be similar to the pixel p and may be a better prediction of pixel p. Using the adaptive weights may then improve compression and accuracy because the reference pixel that may be more similar to the pixel p is weighted higher. Other methods may also be used to determine the weights, such as by analyzing characteristics of the reference pixels to determine which pixels are more similar to the pixel.

For the cases with only one reference pixel available, the prediction method may predict a pixel value for pixel p that is equal to the pixel value for the reference pixel, e.g., p=r. Here, the value of r can be equal to the reference pixel, or may be processed values of the reference pixels. In some embodiments, interpolation, filtering and pulling process are performed on reference pixel values to improve compression efficiency.

Sub-Partition Processing

Figure 8:
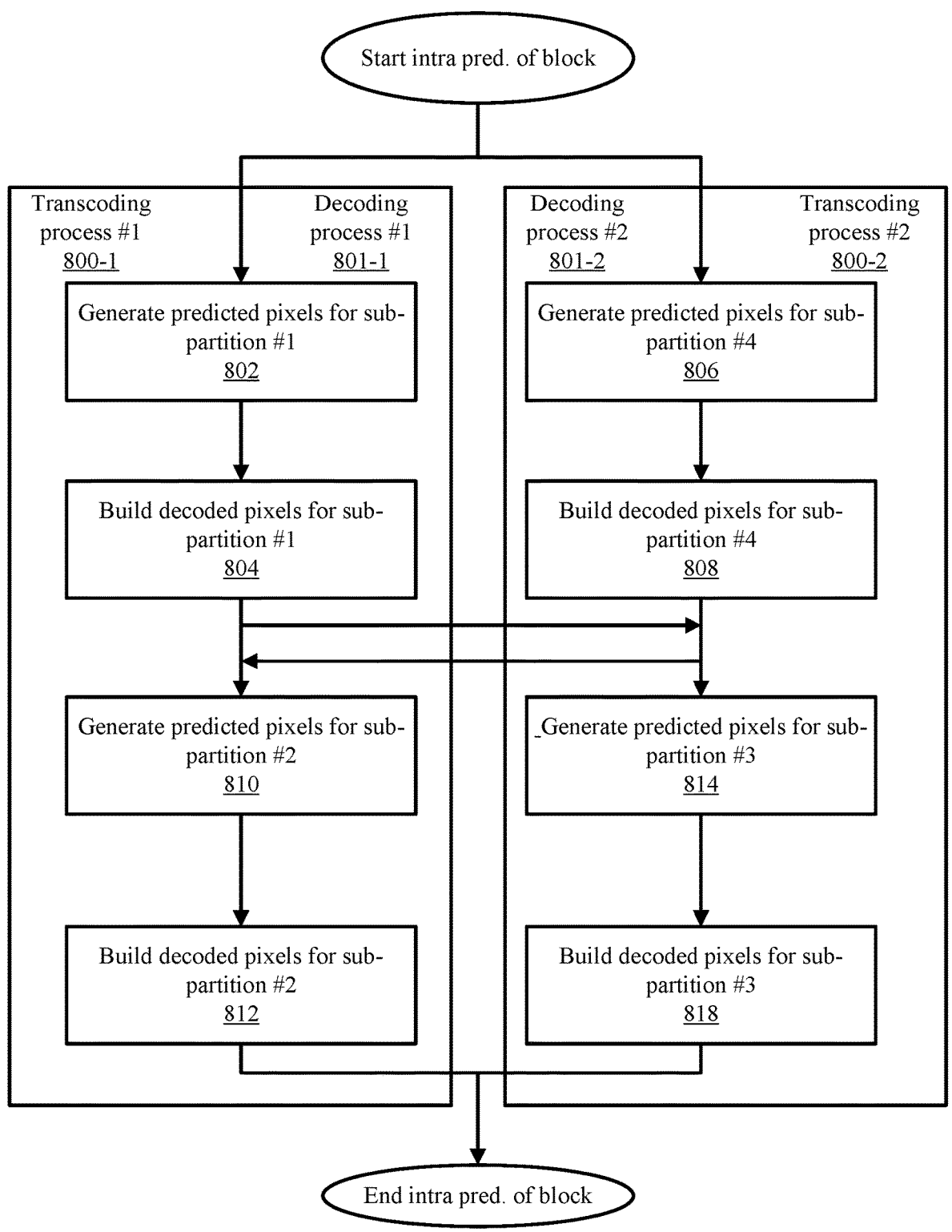
FIG. 8 depicts an example of the processing of sub-partitions in parallel according to some embodiments.

Using the above method, transcoder 106 and decoder 112 can process four sub partitions as two groups in parallel. FIG. 8 depicts an example of the processing of sub-partitions in parallel according to some embodiments. The following processing pipeline may be used in the transcoding process or the decoding process. In the transcoding process, the pipeline generates predicted pixels for a sub-partition and then after the transcoding of the sub-partition, the decoded pixels for the sub-partition are generated for use as reference pixels for another sub-partition. If the process is performed serially, the above process of generating predicted pixels for a sub-partition and then building decoded pixels for the sub-partition is performed for each sub-partition serially. For example, in the serial process, first, transcoder 106 generates predicted pixels for sub-partition #1 502-1, generates a residual and transcodes the residual, and then transcoder 106 builds decoded pixels for sub-partition #1 502-1. Transcoder 106 uses these decoded pixels as reference pixels to generate the predicted pixels for sub-partition #2 502-2. After intra-coding sub-partition #2 502-2, transcoder 106 builds decoded pixels for sub-partition #2 502-2. Transcoder 106 uses these decoded pixels to generate predicted pixels for sub-partition #3 502-3, and the process continues serially until transcoder 106 transcodes the current block. Accordingly, when processing sub-partitions 502 serially, transcoder 106 must conventionally finish transcoding the sub-partition and decoding the pixels for the sub-partition before moving on to transcoding another sub-partition.

As discussed above, transcoder 106 does not need to wait for a prior sub-partition to be transcoded and then decoded before starting the transcoding process for another sub-partition. In FIG. 8, when transcoding of the current block is started, reference pixels for sub-partition #1 502-1 and sub-partition #4 502-4 are the same, and transcoder 106 starts transcoding sub-partition #1 502-1 at 802 and sub-partition #4 502-4 at 806 in parallel. For example, a transcoding process #1 800-1 transcodes sub-partition #1 502-1 and a transcoding process #2 800-2 transcodes sub-partition #4 502-4.

At 802, transcoding process #1 800-1 generates predicted pixels for sub-partition #1 502-1 using reference pixels from adjacent blocks, such as the block to the top of current block 202 and the block to the left of current block 202. Then, transcoding process #1 800-1 performs the transcoding process for sub-partition #1 502-1. After transcoding the pixels, at 804, transcoding process #1 800-1 then reconstructs (e.g., decodes) pixels for sub-partition #1 502-1. In parallel, at 806, transcoding process #2 800-2 generates predicted pixels for sub-partition #4 502-4 using the same reference pixels that were used for sub-partition #1 502-1. Then, transcoding process #2 800-2 performs the transcoding process for sub-partition #4 502-4. After transcoding the pixels, at 808, transcoding process #2 800-2 then reconstructs (e.g., decodes) pixels for sub-partition #3 502-3.

Sub-partition #2 502-2 may use reference pixels from sub-partition #1 502-1, reference pixels from sub-partition #4 502-4, and from adjacent blocks, such as the neighboring block to the left. In some embodiments, transcoding process #1 800-1 receives the decoded pixels from sub-partition #4 502-4 from transcoding process #2 800-2. In this way, transcoding process #1 800-1 can use reference pixels from sub-partition #4 502-4. When receiving decoded pixels is discussed, different implementations may be used. For example, each transcoding process 800-1 and 800-2 may store respective decoded pixels in memory. Once the decoded pixels are stored in memory, each transcoding process 800-1 and 800-2 can proceed with transcoding sub-partition #2 and sub-partition #3.

After reconstructing the decoded pixels for sub-partition #1 502-1, transcoding process #1 800-1 may have to wait to receive the decoded pixels for sub-partition #4 502-4, if needed. Then, at 810, transcoding process #1 800-1 can generate predicted pixels using the reference pixels from sub-partition #1 502-1, reference pixels from sub-partition #4 502-4, and/or the reference pixels from the neighboring block to the left. Transcoding process #1 800-1 performs the transcoding process for sub-partition #2 502-2. After transcoding the pixels, at 812, transcoding process #1 800-1 then reconstructs (e.g., decodes) pixels for sub-partition #2 502-2.

Also, sub-partition #3 502-3 uses reference pixels from sub-partition #1 502-1, reference pixels from sub-partition #4 502-4, and from adjacent blocks, such as the block to the left. In some embodiments, transcoding process #2 800-2 receives the decoded pixels from transcoding process #1 800-1 for sub-partition #1 502-1. In this way, transcoding process #2 800-2 can use reference pixels from sub-partition #1 502-1.

After reconstructing the decoded pixels for sub-partition #4 502-4, transcoding process #2 800-2 may have to wait to receive the decoded pixels for sub-partition #1 502-1, if needed. Then, at 814, transcoding process #2 800-2 can generate predicted pixels using the reference pixels from sub-partition #1 502-1, reference pixels from sub-partition #4 502-4, and/or the reference pixels from the neighboring block to the left. Transcoder 106 performs the transcoding process for sub-partition #3 502-3. After transcoding the pixels, at 818, transcoding process #2 800-2 then reconstructs (e.g., decodes) pixels for sub-partition #3 502-3.

The transcoding process finishes after reconstructing transcoded pixels for sub-partition #2 502-2 and reconstructing transcoded pixels for sub-partition #3 502-3. Accordingly, due to the parallel processing of two groups of sub-partitions 502, transcoder 106 can perform the transcoding process around two times faster compared to performing the processing in serial. Although two groups are described, transcoder 106 may split current block 202 into different numbers of groups. For example, if eight sub-partitions 502 are used, two groups may be used; however, the transcoder may split the sub-partition 502 into four groups to perform the process four times faster than compared to serially and two times faster compared to using two groups.

In the decoding process, the sub-partition 502 may also be decoded in parallel. For example, when decoder 112 starts decoding current block 202, reference pixels for sub-partition #1 502-1 and sub-partition #4 502-4 are the same, and decoder 112 starts decoding sub-partition #1 502-1 and sub-partition #4 502-4 in parallel. Decoder 112 may also use two decoding processes referred to as decoding process #1 801-1 and decoding process #2 801-2 similarly to transcoder 106.

Decoding process #1 801-1 generates predicted pixels for sub-partition #1 502-1 using pixels from adjacent blocks, such as from the block to the top of current block 202 and the block to the left of current block 202. Then, decoding process #1 801-1 performs the decoding process for sub-partition #1 502-1 to generate the residual. After decoding the pixels, decoding process #1 801-1 then reconstructs pixels for sub-partition #1 502-1 using the predicted pixels and the residual. In parallel, decoding process #2 801-2 generates predicted pixels for sub-partition #4 502-4 using the same reference pixels that were used for sub-partition #1 502-1. Then, decoding process #2 801-2 performs the decoding process for sub-partition #4 502-4. After decoding the pixels, decoding process #2 801-2 then reconstructs reference pixels for sub-partition #4 502-4 using the predicted pixels and the residual.

Sub-partition #2 502-2 uses reference pixels from sub-partition #1 502-1, reference pixels from sub-partition #4 502-4, and reference pixels from adjacent blocks, such as the left neighboring block. After decoding the pixels for sub-partition #1 502-1, decoding process #1 801-1 can generate predicted pixels using the reference pixels from sub-partition #1 502-1, reference pixels from sub-partition #4 502-4, and/or the reference pixels 504-3 from the neighboring block to the left. decoding process #1 801-1 performs the decoding process for sub-partition #2 502-2 to generate the residual. After decoding the pixels, decoding process #1 801-1 then reconstructs reference pixels for sub-partition #2 502-2 using the predicted pixels and the residual.

Sub-partition #3 502-3 uses the same reference pixels as sub-partition #2 502-2 and the decoding process may be performed in parallel with sub-partition #2 502-2. Decoding process #2 801-2 performs the decoding process for sub-partition #3 502-3 to generate the residual. After decoding the pixels, decoding process #2 801-2 then reconstructs reference pixels for sub-partition #3 502-3 using the predicted pixels and the residual.

Transcoding Process

Figure 9:
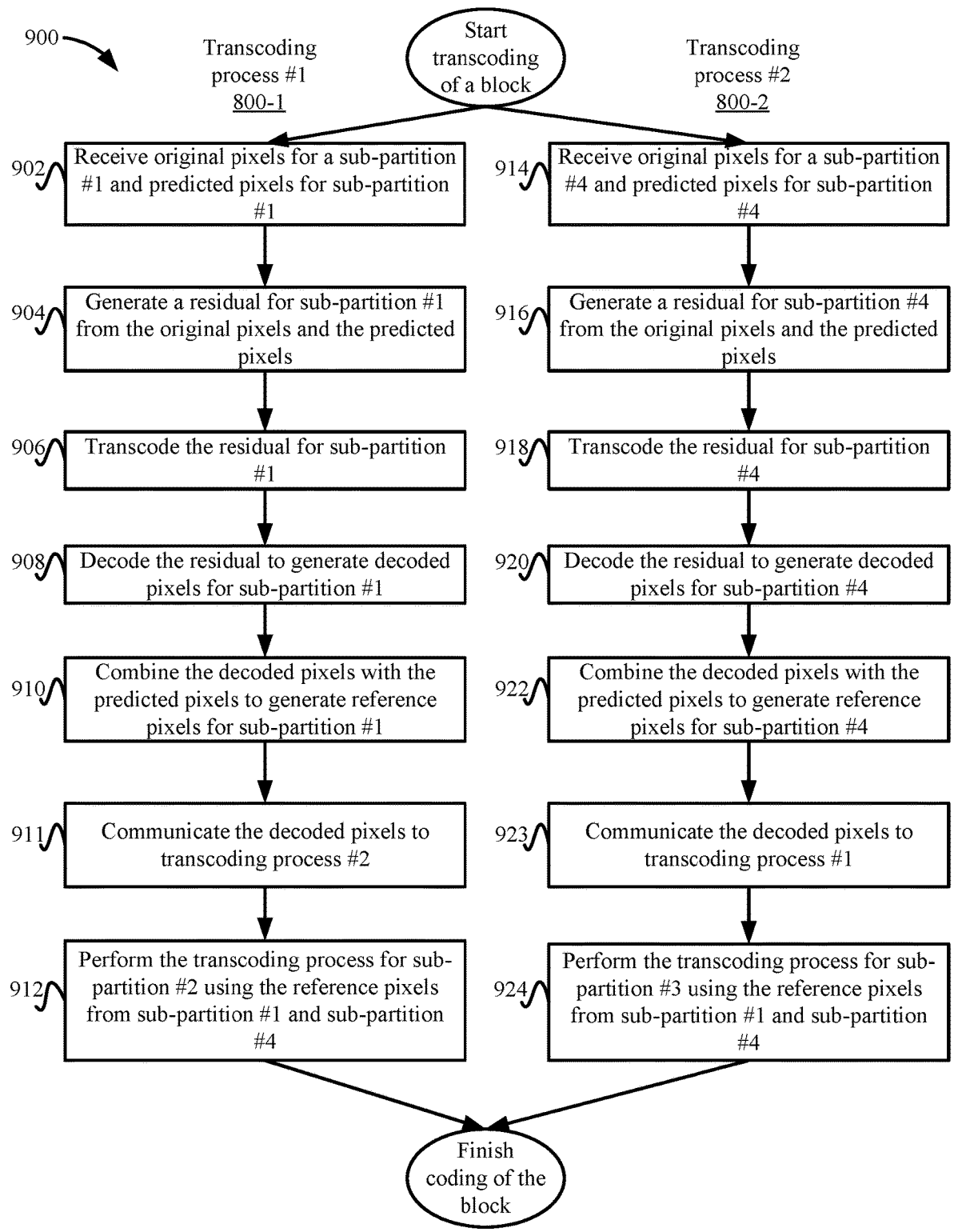
FIG. 9 depicts a more detailed flowchart of the transcoding of a block according to some embodiments.

FIG. 9 depicts a more detailed flowchart 900 of the transcoding of a block according to some embodiments. The above flow discussed the generation of predicted pixels. The following flowchart describes the transcoding process in more detail.

At 902, transcoding process 800-1 receives original pixels for a sub-partition #1 502-1 and predicted pixels for sub-partition #1 502-1. At 904, transcoding process 800-1 generates a residual for sub-partition #1 from the original pixels and the predicted pixels. At 906, transcoding process 800-1 transcodes the residual for sub-partition #1 502-1 by performing transformation and quantization and entropy encoding. At 908, transcoding process #1 800-1 decodes the residual to generate decoded pixels for sub-partition #1 502-1. At 910, transcoding process #1 800-1 combines the decoded pixels with the predicted pixels to generate reference pixels for sub-partition #1 502-1. At 911, transcoding process #1 800-1 communicates the decoded pixels to transcoding process #2 800-2 (e.g., stores the decoded pixels in memory). At 912, the transcoding process for sub-partition #2 502-2 is performed using similar steps as described in 902 to 911. However, sub-partition #2 uses the reference pixels from sub-partition #1 502-1, reference pixels from sub-partition #4 502-4, and/or the reference pixels from the neighboring block to the left. The receipt of decoded pixels from sub-partition #4 502-4 may be needed to finish the transcoding process.

In parallel, the following is performed. It is noted that the corresponding steps may not be performed exactly at the same time. That is, the steps at 902 and 912 do not need to start and end at the same time. Rather, steps at 902 to 912 are performed in parallel with steps at 914 to 924 where each step may proceed at its own pace. However, receipt of decoded pixels from sub-partition #1 502-1 is needed to finish the transcoding process from sub-partition #3 502-3. At 914, transcoding process #2 800-2 receives original pixels for a sub-partition #3 502-3 and predicted pixels for sub-partition #3 502-3. At 916, transcoding process #2 800-2 generates a residual for sub-partition #1 from the original pixels and the predicted pixels. At 918, transcoding process #2 800-2 transcodes the residual for sub-partition #3 502-3 by performing transformation and quantization and entropy encoding. At 920, transcoding process #2 800-2 decodes the residual to generate decoded pixels for sub-partition #3 502-3. At 922, transcoding process #2 800-2 combines the decoded pixels with the predicted pixels to generate reference pixels for sub-partition #3 502-3. At 923, transcoding process #2 800-2 communicates the decoded pixels to transcoding process #1 800-1 (e.g., stores the decoded pixels in memory). At 924, the transcoding process for sub-partition #3 502-3 is performed using similar steps as described in 914 to 923. However, sub-partition #3 uses reference pixels from sub-partition #1 502-1, reference pixels from sub-partition #4 502-4, and/or the reference pixels from the neighboring block to the left. The receipt of decoded pixels from sub-partition #1 502-1 may be needed to finish the transcoding process.

Decoding Process

Figure 10:
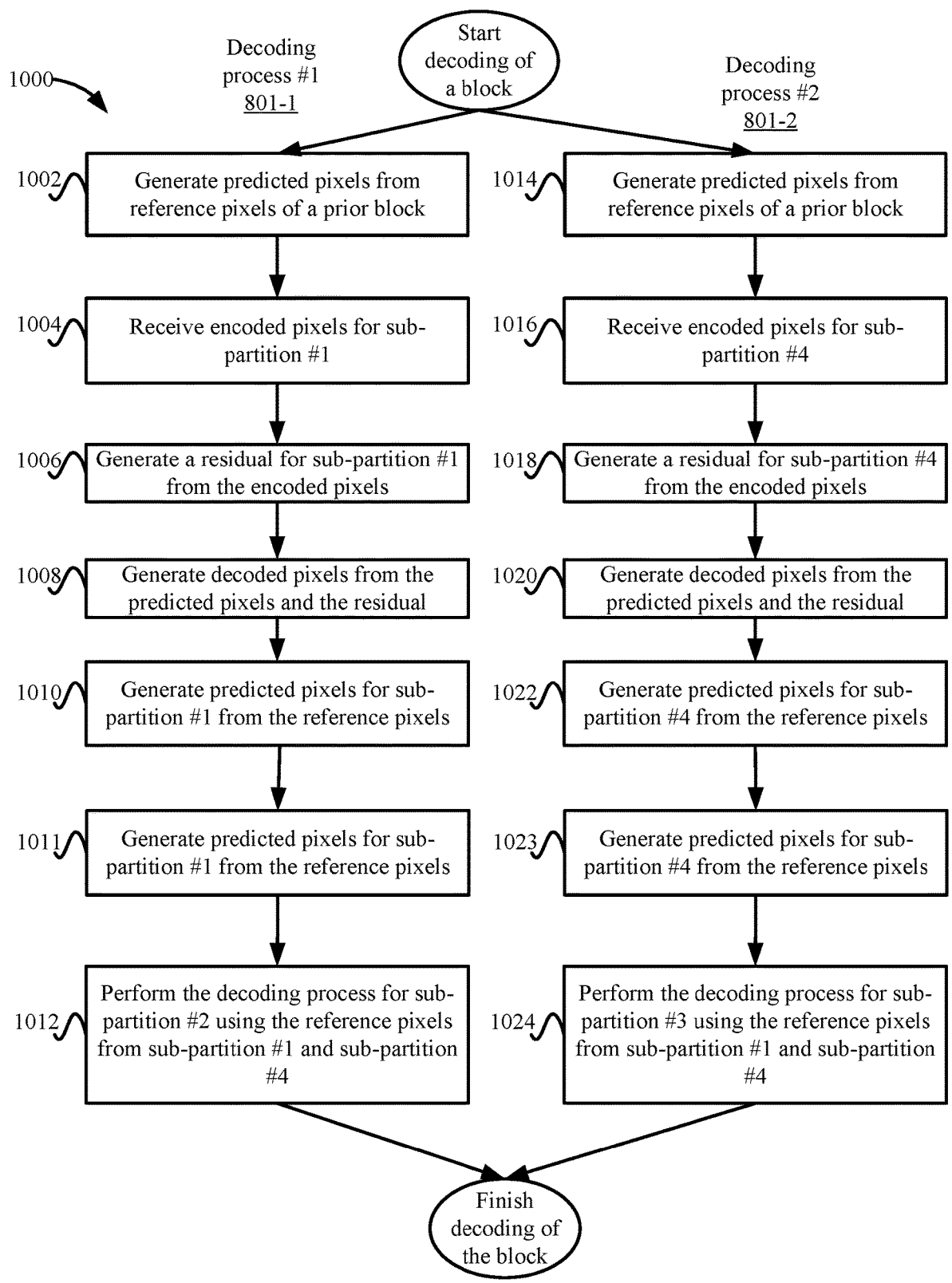
FIG. 10 depicts a more detailed flowchart of the decoding of a block according to some embodiments.

FIG. 10 depicts a more detailed flowchart 1000 of the decoding of a block according to some embodiments. At 1002, decoding process #1 801-1 generates predicted pixels from reference pixels of a prior block. The prior block may be the block to the top of current block 202 and/or to the left of current block 202.

At 1004, decoding process #1 801-1 receives encoded pixels for sub-partition #1 502-1. At 1006, decoding process #1 801-1 generates a residual for sub-partition #1 from the encoded pixels. For example, decoding process #1 801-1 may perform entropy decoding and an inverse quantization and transformation. At 1008, decoding process #1 801-1 generates decoded pixels from the predicted pixels and the residual. For example, decoding process #1 801-1 may combine the decoded pixels with the predicted pixels.

At 1010, decoding process #1 801-1 generates predicted pixels for sub-partition #1 from the reference pixels. At 1011, decoding process #1 801-1 communicates the decoded pixels to transcoding process #2 1002-2. At 1012, decoding process #1 801-1 performs the prediction process for sub-partition #2. The process may be similar to steps 1002-1011. However, sub-partition #2 uses the reference pixels from sub-partition #1 502-1, reference pixels from sub-partition #4 502-4, and/or the reference pixels from the block to the left. The receipt of decoded pixels from sub-partition #4 502-4 is needed to finish the transcoding process.

In parallel, the following is performed. It is noted that the corresponding steps may not be performed exactly at the same time. That is, the steps at 1002 and 1014 do not need to start and end at the same time. Rather, steps at 1002 to 1012 are performed in parallel with steps at 1014 to 1024 where each step may proceed at its own pace. However, receipt of decoded pixels from sub-partition #1 502-1 may be needed. At 1014, decoding process #2 801-2 generates predicted pixels from reference pixels of a prior block. At 1016, decoding process #2 801-2 receives encoded pixels for sub-partition #3. At 1018, decoding process #2 801-2 generates a residual for sub-partition #3 from the encoded pixels. At 1020, decoding process #2 801-2 generates decoded pixels from the predicted pixels and the residual. At 1022, decoding process #2 801-2 generates predicted pixels for sub-partition #3 from the reference pixels. At 1023, decoding process #1 801-1 communicates the decoded pixels to transcoding process #2 1002-2. At 1024, decoding process #2 801-2 performs the prediction process for sub-partition #3. The process may be similar to steps 1014-1023. However, sub-partition #3 uses reference pixels from sub-partition #1 502-1, reference pixels from sub-partition #4 502-4, and/or the reference pixels from the block to the left. The receipt of decoded pixels from sub-partition #1 502-1 is needed to finish the transcoding process.

Conclusion

In summary, some embodiments break up the data dependency among sub-partitions and allow the process to be performed in parallel. Furthermore, some embodiments introduce a weighted bi-directional prediction method for the pixels in the central region of a coding block. This enhances the prediction accuracy and results in better compression efficiency of the video.

System

Figure 11:
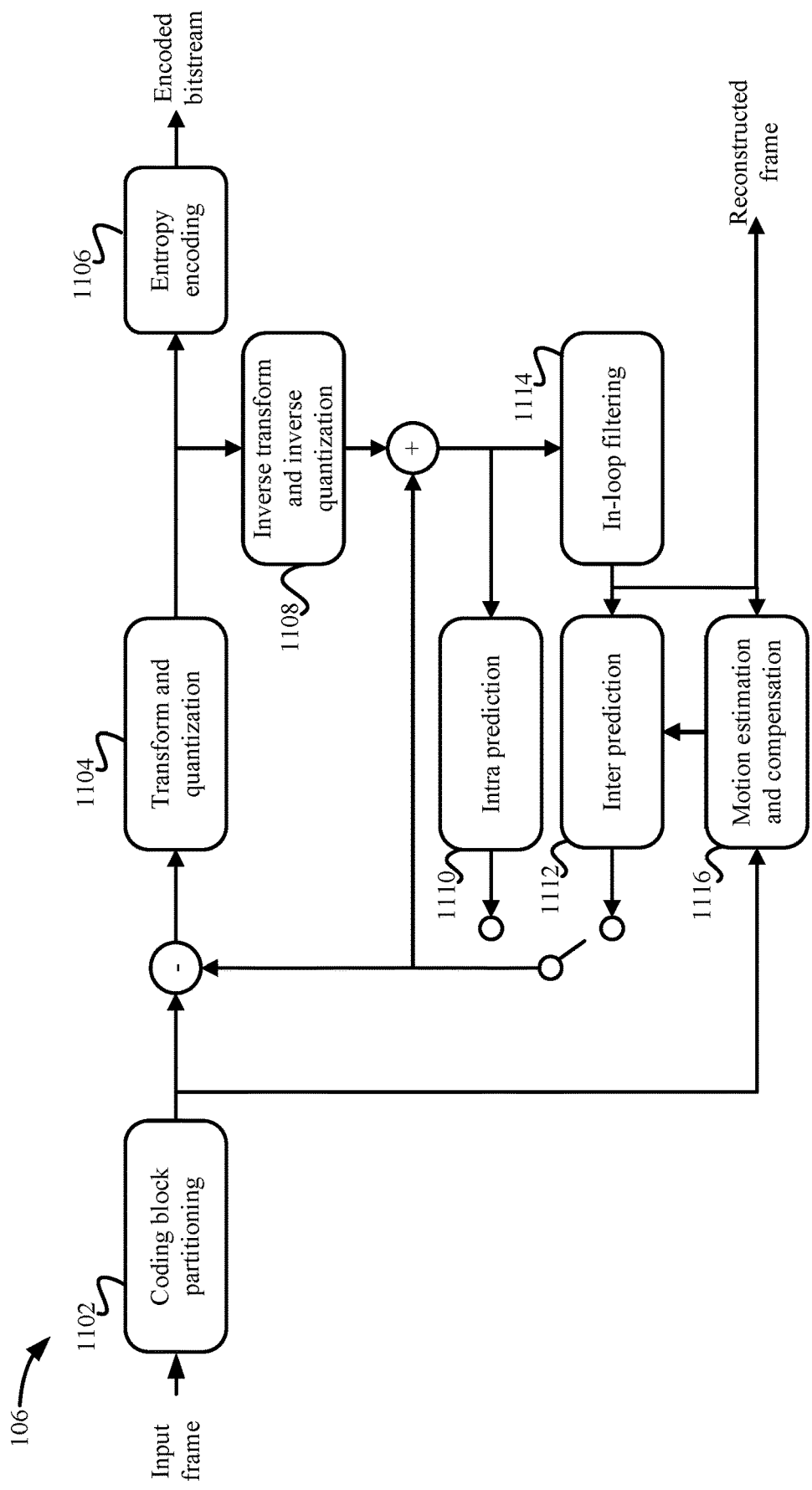
FIG. 11 depicts an example of an encoding system according to some embodiments.

FIG. 11 depicts an example of an encoding system according to some embodiments. A video codec framework includes a set of fundamental components: block partitioning, inter and intra prediction, transform and quantization, and entropy coding.

Transcoder 106 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern, and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 1110, which is using reference pixels in the current frame, aims to reduce the spatial redundancy within the frame. An inter prediction block 1112, which is using reference pixels from neighboring frames, attempts to remove the temporal redundancy between frames. A motion estimation and compensation block 1116 may be a sub-module of inter prediction at the encoder side, which captures the motion trace of objects among adjacent frames and generates reference pixels for inter prediction.

A transform and quantization block 1104 uses the residual pixels after intra or inter prediction. Transform and quantization block 1104 performs a transform operation that represents the residual signal in a frequency domain. Considering the human visual system is more sensitive to low frequency components of video signal than the high frequency components, quantization is designed to further compress the residual signal by reducing the precision on high frequency signals.

To avoid the out-of-sync issue between encoder 1100 and decoder 600, encoder 1100 contains decoding modules to make sure both encoder 1100 and decoder 600 are using identical mathematical processes. Thus, an inverse transform and inverse quantization block 1108 is similar to the corresponding block on the decoder side. Inverse transform and inverse quantization block 1108 reconstructs pixels using the intra and inter prediction.

An in-loop filter 1114 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 1106 may further compress the bitstream using a model-based method. Transcoder 106 transmits the resulting encoded bitstream to decoder 112 over a network or other types of medium.

Figure 12:
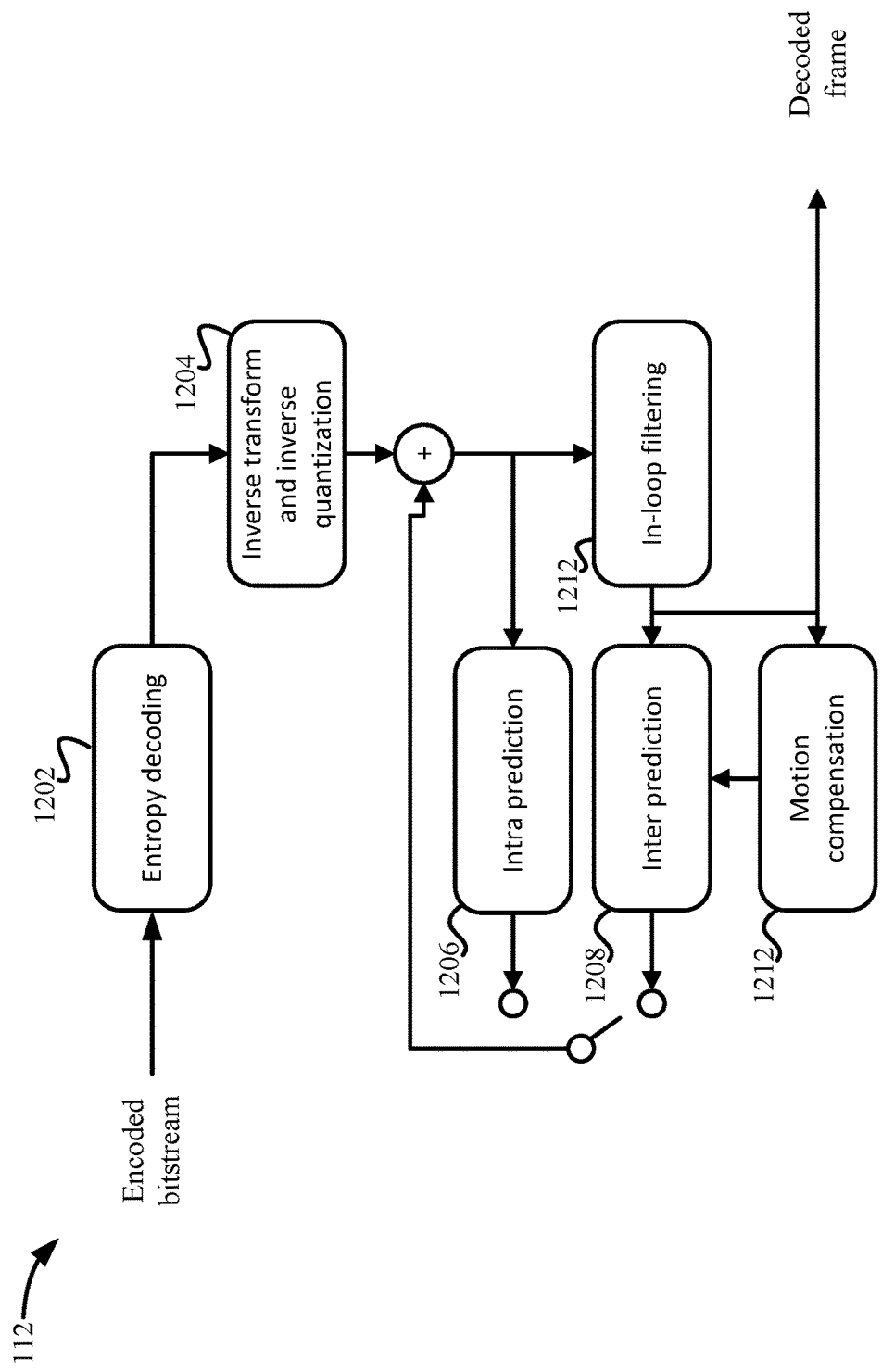
FIG. 12 depicts an example of a decoding system according to some embodiments.

FIG. 12 depicts an example of a decoding system according to some embodiments. Decoder 112 receives the encoded bitstream and inputs it into an entropy decoding block 1202 to recover the information needed for decoding process. As above-mentioned, a decoded frame can be decoded by using an inverse transform and inverse quantization block 1204, an intra prediction block 1206 or inter prediction block 1208, motion compensation block 1210, and in-loop filtering block 1212 in the same way to build a decoded frame.

Example Embodiments

In some embodiments, a method comprising: determining, by a computing device, a first set of reference pixels for a current block to be coded, the current block being split into a plurality of sub-partitions; processing, by the computing device, a first sub-partition and a second sub-partition in the plurality of sub-partitions in parallel using the first set of reference pixels; generating, by the computing device, a second set of reference pixels from the first sub-partition and a third set of reference pixels from the second sub-partition; and processing, by the computing device, a third sub-partition in the plurality of sub-partitions based on one or more of at least a portion of the first set of reference pixels, the second set of reference pixels, and the third set of reference pixels and processing a fourth sub-partition in the plurality of sub-partitions based on one or more of at least a portion of the first set of reference pixels, the second set of reference pixels, and the third set of reference pixels.

In some embodiments, processing the third sub-partition and the fourth sub-partition comprises: using a first reference pixel from one of the first set of reference pixels, the second set of reference pixels, and the third set of reference pixels; and using a second reference pixel from one of the first set of reference pixels, the second set of reference pixels, and the third set of reference pixels that is not used by the first reference pixel.

In some embodiments, processing the third sub-partition and the fourth sub-partition comprises: using a first weight for the first reference pixel and using a second weight for the second reference pixel to determine a predicted pixel value for a pixel being coded in the current block, wherein the first weight and the second weight are different values.

In some embodiments, processing the third sub-partition and the fourth sub-partition comprises: calculating a first distance from the first reference pixel to the pixel; calculating a second distance from the second reference pixel to the pixel; and using the first distance and the second distance to calculate the first weight and the second weight.

In some embodiments, processing the third sub-partition and the fourth sub-partition comprises: using a single reference pixel from one of the first set of reference pixels, the second set of reference pixels, and the third set of reference pixels.

In some embodiments, the first set of reference pixels comprises pixels from one or more neighboring blocks to the current block in a frame.

In some embodiments, the first sub-partition is located at a first position along an edge of the current block, and the second sub-partition is not located next to the first sub-partition.

In some embodiments, the third sub-partition and the fourth sub-partition are located in between the first sub-partition and the second sub-partition.

In some embodiments, the at least a portion of the first set of reference pixels are located next to the second sub-partition and the third sub-partition, and the at least a portion of the first set of reference pixels are in a neighboring block to the current block.

In some embodiments, the method further comprising: processing the first sub-partition using a first transcoding process using the first set of reference pixels; and processing the second sub-partition using a second transcoding process using the first set of reference pixels in parallel with the processing of the first sub-partition.

In some embodiments, the method further comprising: providing the second set of reference pixels from the first transcoding process to the second transcoding process for use in processing the fourth sub-partition, and providing the third set of reference pixels from the second transcoding process to the first transcoding process for use in processing the third sub-partition.

In some embodiments, the second set of reference pixels are generated from decoded pixels of the first sub-partition, and the third set of reference pixels are generated from decoded pixels of the second sub-partition.

In some embodiments, the second set of reference pixels are generated from a first residual of the first sub-partition, and the third set of reference pixels are generated from a second residual of the second sub-partition.

In some embodiments, processing the first sub-partition using the first set of reference pixels and the second sub-partition using the first set of reference pixels in parallel comprises: generating first predicted pixels from the first set of reference pixels; using the first predicted pixels to transcode the first sub-partition; generating second predicted pixels from the second set of reference pixels; and using the second predicted pixels to transcode the second sub-partition.

In some embodiments, processing the third sub-partition in the plurality of sub-partitions based on one or more of at least a portion of the first set of reference pixels, the second set of reference pixels, and the third set of reference pixels and processing the fourth sub-partition in the plurality of sub-partitions based on one or more of at least a portion of the first set of reference pixels, the second set of reference pixels, and the third set of reference pixels comprises: generating third predicted pixels based on one or more of at least a portion of the first set of reference pixels, the second set of reference pixels, and the third set of reference pixels; using the third predicted pixels to transcode the third sub-partition; generating fourth predicted pixels based on one or more of at least a portion of the first set of reference pixels, the second set of reference pixels, and the third set of reference pixels; and using the fourth predicted pixels to transcode the fourth sub-partition.

In some embodiments, the second set of reference pixels are generated from first decoded pixels of the first sub-partition and the first predicted pixels, and the third set of reference pixels are generated from second decoded pixels of the second sub-partition and the second predicted pixels.

In some embodiments, processing the first sub-partition using the first set of reference pixels and the second sub-partition using the first set of reference pixels in parallel comprises: decoding the first sub-partition; generating first predicted pixels from the first set of reference pixels; generating the second set of reference pixels from the decoded first sub-partition and the first predicted pixels; decoding the second sub-partition; generating second predicted pixels from the second set of reference pixels; and generating the third set of reference pixels from the decoded second sub-partition and the second predicted pixels.

In some embodiments, a non-transitory computer-readable storage medium containing instructions, that when executed, control a computer system to be operable for: determining a first set of reference pixels for a current block to be coded, the current block being split into a plurality of sub-partitions; processing a first sub-partition and a second sub-partition in the plurality of sub-partitions in parallel using the first set of reference pixels; generating a second set of reference pixels from the first sub-partition and a third set of reference pixels from the second sub-partition; and processing a third sub-partition in the plurality of sub-partitions based on one or more of at least a portion of the first set of reference pixels, the second set of reference pixels, and the third set of reference pixels and processing a fourth sub-partition in the plurality of sub-partitions based on one or more of at least a portion of the first set of reference pixels, the second set of reference pixels, and the third set of reference pixels.

In some embodiments, processing the third sub-partition and the fourth sub-partition comprises: using a first reference pixel from one of the first set of reference pixels, the second set of reference pixels, and the third set of reference pixels; and using a second reference pixel from one of the first set of reference pixels, the second set of reference pixels, and the third set of reference pixels that is not used by the first reference pixel.

In some embodiments, an apparatus comprising: one or more computer processors; and a non-transitory computer-readable storage medium comprising instructions, that when executed, control the one or more computer processors to be operable for: determining a first set of reference pixels for a current block to be coded, the current block being split into a plurality of sub-partitions; processing a first sub-partition in the plurality of sub-partitions using the first set of reference pixels and a second sub-partition in the plurality of sub-partitions using the first set of reference pixels in parallel; and processing a third sub-partition in the plurality of sub-partitions based on a second set of reference pixels determined from the processing of the first sub-partition and processing a fourth sub-partition in the plurality of sub-partitions based on a third set of reference pixels determined from the processing of the second sub-partition.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a first set of reference pixels for a current block to be coded, the current block being split into a plurality of sub-partitions;
   processing, by the computing device, a first sub-partition and a second sub-partition in the plurality of sub-partitions in parallel using the first set of reference pixels;
   generating, by the computing device, a second set of reference pixels from the first sub-partition and a third set of reference pixels from the second sub-partition; and processing, by the computing device, a third sub-partition in the plurality of sub-partitions by selecting a first reference pixel from the first set of reference pixels, the second set of reference pixels, and the third set of reference pixels and processing a fourth sub-partition in the plurality of sub-partitions by selecting a second reference pixel from the first set of reference pixels, the second set of reference pixels, and the third set of reference pixels.

2. The method of claim 1, wherein processing the third sub-partition comprises:
using the first reference pixel from one of the first set of reference pixels, the second set of reference pixels, and the third set of reference pixels; and
using a third reference pixel from one of the first set of reference pixels, the second set of reference pixels, and the third set of reference pixels that is not used by the first reference pixel.

3. The method of claim 2, wherein processing the third sub-partition comprises:
using a first weight for the first reference pixel and using a second weight for the third reference pixel to determine a predicted pixel value for a pixel being coded in the current block, wherein the first weight and the second weight are different values.

4. The method of claim 3, wherein processing the third sub-partition comprises:
calculating a first distance from the first reference pixel to the pixel;
calculating a second distance from the third reference pixel to the pixel; and
using the first distance and the second distance to calculate the first weight and the second weight.

5. The method of claim 1, wherein processing the third sub-partition comprises:
using first reference pixel as a single reference pixel to determine a predicted pixel value for a pixel being coded in the current block.

6. The method of claim 1, wherein the first set of reference pixels comprises pixels from one or more neighboring blocks to the current block in a frame.

7. The method of claim 1, wherein:
the first sub-partition is located at a first position along an edge of the current block, and
the second sub-partition is not located next to the first sub-partition.

8. The method of claim 7, wherein:
the third sub-partition and the fourth sub-partition are located in between the first sub-partition and the second sub-partition.

9. The method of claim 1, wherein:
the at least a portion of the first set of reference pixels are located next to the second sub-partition and the third sub-partition, and
the at least a portion of the second set of reference pixels or the third set of reference pixels are in a neighboring block to the current block.

10. The method of claim 1, further comprising:
processing the first sub-partition using a first transcoding process using the first set of reference pixels; and
processing the second sub-partition using a second transcoding process using the first set of reference pixels in parallel with the processing of the first sub-partition.

11. The method of claim 10, further comprising:
providing the second set of reference pixels from the first transcoding process to the second transcoding process for use in processing the fourth sub-partition, and
providing the third set of reference pixels from the second transcoding process to the first transcoding process for use in processing the third sub-partition.

12. The method of claim 1, wherein:
the second set of reference pixels are generated from decoded pixels of the first sub-partition, and
the third set of reference pixels are generated from decoded pixels of the second sub-partition.

13. The method of claim 1, wherein:
the second set of reference pixels are generated from a first residual of the first sub-partition, and
the third set of reference pixels are generated from a second residual of the second sub-partition.

14. The method of claim 1, wherein processing the first sub-partition using the first set of reference pixels and the second sub-partition using the first set of reference pixels in parallel comprises:
generating first predicted pixels from the first set of reference pixels;
using the first predicted pixels to transcode the first sub-partition;
generating second predicted pixels from the second set of reference pixels; and
using the second predicted pixels to transcode the second sub-partition.

15. The method of claim 14, wherein processing the third sub-partition and processing the fourth sub-partition comprises:
generating third predicted pixels by selecting reference pixels from the first set of reference pixels, the second set of reference pixels, and the third set of reference pixels;
using the third predicted pixels to transcode the third sub-partition;
generating fourth predicted pixels by selecting reference pixels from the first set of reference pixels, the second set of reference pixels, and the third set of reference pixels; and
using the fourth predicted pixels to transcode the fourth sub-partition.

16. The method of claim 15, wherein:
the second set of reference pixels are generated from first decoded pixels of the first sub-partition and the first predicted pixels, and
the third set of reference pixels are generated from second decoded pixels of the second sub-partition and the second predicted pixels.

17. The method of claim 1, wherein processing the first sub-partition using the first set of reference pixels and the second sub-partition using the first set of reference pixels in parallel comprises:
decoding the first sub-partition;
generating first predicted pixels from the first set of reference pixels;
generating the second set of reference pixels from the decoded first sub-partition and the first predicted pixels;
decoding the second sub-partition;
generating second predicted pixels from the second set of reference pixels; and
generating the third set of reference pixels from the decoded second sub-partition and the second predicted pixels.

18. A non-transitory computer-readable storage medium containing instructions, that when executed, control a computer system to be operable for:
- determining a first set of reference pixels for a current block to be coded, the current block being split into a plurality of sub-partitions;
- processing a first sub-partition and a second sub-partition in the plurality of sub- partitions in parallel using the first set of reference pixels;
- generating a second set of reference pixels from the first sub-partition and a third set of reference pixels from the second sub-partition; and
- processing a third sub-partition in the plurality of sub-partitions by selecting a first reference pixel from the first set of reference pixels, the second set of reference pixels, and the third set of reference pixels and processing a fourth sub-partition in the plurality of sub-partitions by selecting a second reference pixel from the first set of reference pixels, the second set of reference pixels, and the third set of reference pixels.

19. The non-transitory computer-readable storage medium of claim 18, wherein processing the third sub-partition and the fourth sub-partition comprises:
- using a first reference pixel from one of the first set of reference pixels, the second set of reference pixels, and the third set of reference pixels; and
- using a second reference pixel from one of the first set of reference pixels, the second set of reference pixels, and the third set of reference pixels that is not used by the first reference pixel.

20. A method comprising:
- determining, by the computing device, a first set of reference pixels for a current block to be coded, the current block being split into a plurality of sub-partitions;
- processing, by the computing device using a first process, a first sub-partition in the plurality of sub-partitions using the first set of reference pixels to generate first predicted pixels;
- processing, by the computing device using a second process, a second sub-partition in the plurality of sub-partitions using the first set of reference pixels in parallel to generate second predicted pixels;
- communicating, by the computing device, first decoded pixels from the first predicted pixels from the first process to the second process;
- communicating, by the computing device, second decoded pixels from the second predicted pixels from the second process to the first process;
- processing, by the computing device using the first process, a third sub-partition in the plurality of sub-partitions based on a second set of reference pixels determined from the first decoded pixels and the first set of reference pixels; and
- processing, by the computing device using the first process, a fourth sub-partition in the plurality of sub-partitions based on a third set of reference pixels determined from the second decoded pixels and the first set of reference pixels.

* * * * *